United States Patent [19]
Fujita

[11] Patent Number: 5,553,011
[45] Date of Patent: Sep. 3, 1996

[54] WAVEFORM GENERATING APPARATUS FOR MUSICAL INSTRUMENT

[75] Inventor: Yoshio Fujita, Hamamatsu, Japan

[73] Assignee: Yamaha Corporation, Hamamatsu, Japan

[21] Appl. No.: 391,466

[22] Filed: Feb. 21, 1995

Related U.S. Application Data

[63] Continuation of Ser. No. 620,826, Nov. 29, 1990, abandoned.

[30] Foreign Application Priority Data

Nov. 30, 1989 [JP] Japan .................................... 1-311080

[51] Int. Cl.$^6$ ........................................................ G06F 1/02
[52] U.S. Cl. ............................................ 364/718; 84/604
[58] Field of Search ................................... 364/718–721; 84/604

[56] References Cited

U.S. PATENT DOCUMENTS

| | | | |
|---|---|---|---|
| 3,952,189 | 4/1976 | Fabricius | 364/718 |
| 4,246,823 | 1/1981 | Wachi et al. | 84/1.22 |
| 4,715,257 | 12/1987 | Hoshiai et al. | 84/604 X |
| 4,738,179 | 4/1988 | Hideo | 84/604 |
| 4,809,577 | 3/1989 | Fujita | 364/718 X |

FOREIGN PATENT DOCUMENTS

| | | |
|---|---|---|
| 54-107331 | 8/1979 | Japan . |
| 55-99039 | 7/1980 | Japan . |
| 59-17838 | 4/1984 | Japan . |
| 63-15300 | 1/1988 | Japan . |
| 63-168695 | 7/1988 | Japan . |

Primary Examiner—Tan V. Mai
Attorney, Agent, or Firm—Loeb & Loeb LLP

[57] ABSTRACT

A waveform generating apparatus for generating waveforms which can be suitably employed in electronic musical instruments. The waveform generating apparatus calculates and generates regenerated sample data of a regenerated waveform having a desired pitch in synchronization with a constant regeneration sampling interval based on basic sample data which are sampled from a basic waveform by a predetermined basic sampling interval. The apparatus includes a phase generator, an operation mode control circuit and an interpolating circuit. The phase generator generates phase data which designates a phase of basic waveform. The operation mode control circuit supplies a calculation designating data. The interpolating circuit calculates regenerated sample data on the basis of basic sample data and phase data. Wherein, the method of the interpolation which is performed by the interpolating circuit is altered in response to calculation designating data. Thus, waveform can be regenerated accurately and with high fidelity over a wide range of pitches.

12 Claims, 21 Drawing Sheets

| CALCULATION CYCLE | M2 | | | | | | | | M3 | |
|---|---|---|---|---|---|---|---|---|---|---|
| TIME SLOT | 0 | 1 | 2 | 3 | 4 | 5 | 6 | 7 | 0 | 1 |
| S0 | | | | | | | | | | |
| KON | | | | | | | | | | |
| KONP | | | | | | | | | | |
| MUTE | | | | | | | | | | |
| SUB | | | ⎴ | ⎴ | | | | | | |
| S1 | 3 | | 1 | | | | | | 3 | |
| S2 | 2 | | 1 | | | | | | 2 | |
| FA1 A INPUT | $LA_2(WA_0)$ | | END | | | | | | $LA_2(WA_1)$ | |
| FA1 B INPUT | INTG | | $-LA_1 = -(WA_0+INTG)$ | | | | | | INTG | |
| LA1 | | | $WA_0 + INTG$ | | | | | | | |
| LA2 | $IA = WA_0 (=START)$ | | | | | | | | $IA = WA_1 (= WA_0 + INTG)$ | |
| S3 | 1 | | 0 | | | | | | 1 | |
| EQ1(A=B) | | | | | | | | | | |
| ALB(A≥B) | | | | | | | | | | |
| S4 | 1 | | 0 | | | | | | 1 | |
| S5 | 1 | | | | | | | | | |
| S6 | 1 | | | | | | | | | |
| FA2 A INPUT | START | | $WA_0+1$ | $WA_0+2$ | $WA_0+3$ | | | | $WA_1$ | |
| FA2 B INPUT | 1 | | | | | | | | | |
| LA3 | | | $WA_0+1$ | $WA_0+2$ | $WA_0+3$ | $WA_0+4$ | | | | |

IN THE CASE WHERE 3RD = "0"

FIG. 7B

| CALCULATION CYCLE | M3 | | | | | | | | M4 | | | |
|---|---|---|---|---|---|---|---|---|---|---|---|---|
| TIME SLOT | 0 | 1 | 2 | 3 | 4 | 5 | 6 | 7 | 0 | 1 | 2 | 3 |
| $S_0$ | | | | | | | | | | | | |
| KON | | | | | | | | | | | | |
| KONP | | | | | | | | | | | | |
| MUTE | | | | | | | | | | | | |
| SUB | | | ⎍ | | | | | | | | ⎍ | |
| $S_1$ | 3 | | 1 | | | | | | | | 3 | |
| $S_2$ | 2 | | 1 | | | | | | | | 2 | |
| FA1 A INPUT | $LA_2(WA_1)$ | | END | | | | | | | | | |
| FA1 B INPUT | INTG | | $-LA_1 = -(WA_1 + INTG)$ | | | | | | | | | |
| $LA_1$ | | | $\phi_1$ | | | | | | | | | |
| | | | $WA_1 + INTG$ | | | | | | | | | |
| $LA_2$ | $IA = WA_1 \ ( = WA_0 + INTG)$ | | | | | | | | | | | |
| $S_3$ | 1 | | 0 | | | | | | 1 | | 0 | |
| EQ1(A=B) | | | | | | | | | | | | |
| ALB(A≥B) | | | | | | | | | | | | |
| $S_4$ | 1 | | 0 | | | | | | 1 | | 0 | |
| $S_5$ | | | | | | | | | | | | |
| $S_6$ | | | | | | | | | | | | |
| FA2 A INPUT | $WA_1$ | $WA_1 + 1$ | $WA_1 + 2$ | $WA_1 + 3$ | | | | | $WA_2$ | | | |
| FA2 B INPUT | | | | | | | | | | | | |
| $LA_3$ | $WA_0 + 4$ | $WA_1 + 1$ | $WA_1 + 2$ | $WA_1 + 3$ | | | | | $WA_1 + 4$ | | | |

IN THE CASE WHERE 3RD = "0"

FIG. 7C

| CALCULATION CYCLE | $M_2$ | | | | | | | | | |
|---|---|---|---|---|---|---|---|---|---|---|
| TIME SLOT | 0 | 1 | 2 | 3 | 4 | 5 | 6 | 7 | 0 | 1 |
| $S_0$ | | | | | | | | | | |
| KON | | | | | | | | | | |
| KONP | | | | | | | | | | |
| MUTE | | | | | | | | | | |
| SUB | | | ⎤‾‾‾⎡ | | | | | | | |
| $S_1$ | 3 | | 1 | | | | | | 3 | |
| $S_2$ | 2 | | 1 | | | | | | 2 | |
| FA1 A INPUT | $LA_2(WA_0)$ | | END | | | | | | | |
| FA1 B INPUT | INTG | | $-LA_1 = -(WA_0 + INTG)$ | | | | | | | |
| $LA_1$ | | | $WA_0 + INTG$ ↙$\phi_1$ | | | | | | | |
| $LA_2$ | $IA = WA_0 (= START)$ | | | | | | | ↙$\phi_C$ | $IA = WA_1 (= WA_0 + INTG)$ | |
| $S_3$ | 1 | | 0 | | | | | | 1 | |
| $EQ_1(A=B)$ | | | | | | | | | | |
| $ALB(A \geq B)$ | | | | | | | | | | |
| $S_4$ | 1 | | 0 | | | | | | 1 | |
| $S_5$ | 1 | | | | | | | | | |
| $S_6$ | 0 | | 1 | | | | | | 0 | |
| FA2 A INPUT | START | $WA_0$ | | | $WA_0 + 1$ | | $WA_0 + 2$ | | $WA_1$ | |
| FA2 B INPUT | 0 | | 1 | | | | | | 0 | |
| $LA_3$ | | | $WA_0(=START)$ | | $WA_0 + 1$ | | $WA_0 + 2$ | | $WA_0 + 3$ | |

IN THE CASE WHERE 3RD = "1"

FIG. 8B

| CALCULATION CYCLE | M3 | | | | | | | | M4 | |
|---|---|---|---|---|---|---|---|---|---|---|
| TIME SLOT | 0 | 1 | 2 | 3 | 4 | 5 | 6 | 7 | 0 | 1 |
| $S_0$ | | | | | | | | | | |
| KON | | | | | | | | | | |
| KONP | | | | | | | | | | |
| MUTE | | | | | | | | | | |
| SUB | | | ⎯⎯⎯⎯ | | | | | | | |
| $S_1$ | 3 | | 1 | | | | | | | |
| $S_2$ | 2 | | 1 | | | | | | | |
| FA1 A INPUT | $LA_2(WA_1)$ | | END | | | | | | | |
| FA1 B INPUT | INTG | | $-LA_1 = -(WA_1 + INTG)$ | | | | | | | |
| $LA_1$ | | $\phi_1$ | $WA_1 + INTG$ | | | | | | | |
| $LA_2$ | $\phi_c$ | $IA = WA_1 (= WA_0 + INTG)$ | | | | | | | | |
| $S_3$ | 1 | | 0 | | | | | | 1 | |
| $EQ_1(A=B)$ | | | | | | | | | | |
| ALB(A≥B) | | | | | | | | | | |
| $S_4$ | 1 | | 0 | | | | | | 1 | |
| $S_5$ | | | | | | | | | | |
| $S_6$ | 0 | | 1 | | | | | | 0 | |
| FA2 A INPUT | $WA_1$ | $WA_1$ | $WA_1 + 1$ | | $WA_1 + 2$ | | $WA_2$ | | | |
| FA2 B INPUT | 0 | | 1 | | | | | | 0 | |
| $LA_3$ | $WA_0 + 3$ | $WA_1$ | $WA_1 + 1$ | | $WA_1 + 2$ | | $WA_1 + 3$ | | | |

IN THE CASE WHERE 3RD = "1"

| CALCULATION CYCLE | | | | | | Mj | | | | | | |
|---|---|---|---|---|---|---|---|---|---|---|---|---|
| TIME SLOT | 7 | 0 | 1 | 6 | 7 | 0 | 1 | 2 | 3 | 4 | 5 | 6 | 7 |
| $S_0$ | "0" | | | | | | | | | | | | |
| KON | "1" | | | | | | | | | | | | |
| KONP | "1" | | | | | | | | | | | | |
| MUTE | "1" | | | | | | | | | | | | |
| SUB | "0" | | | | | | | | | | | | |
| $S_1$ | | | | | | | | | | | | | |
| $S_2$ | | | | | | | | | | | | | |
| FA1 A INPUT | | | | | | | | | | | | | |
| FA1 B INPUT | | | | | | | | | | | | | |
| $LA_1$ | | | | | | | | | | | | | |
| $LA_2$ | | | | | | | WAn−2 | | | | | | |
| $S_3$ | | | | | | | | | | | | | |
| $EQ_1$ | "0" | | | | | | | | | | | | |
| ALB | "0" | | | | | | | | | | | | |
| $S_4$ | | | | | | 1 | 0 | | | | | | |
| $S_5$ | 1 | | | | | | | | | 0 | 1 | | |
| $S_6$ | 1 | | | | | | | | | 0 | 1 | | |
| FA2 A INPUT | | | | | | WAn−2 | WAn−2+1 | WAn−2+2 | | | | | |
| FA2 B INPUT | 1 | | | | | | | | | 0 | | | |
| $LA_3$ | | | | | | WAn−3+4 | WAn−2+1 | WAn−2+2 | | | | | |
| $EQ_2$ | | | | | | | | | | | | | |

FIG.12

| CALCULATION CYCLE TIME SLOT | | Mi | | | | | | | | Mi+1 | |
|---|---|---|---|---|---|---|---|---|---|---|---|
| | | 0 | 1 | 2 | 3 | 4 | 5 | 6 | 7 | 0 | 1 |
| SAMPLE DATA | INTG=0 (a) | | | Wk+1 | | Wk+2 | | Wk+3 | | Wk+4 | |
| | INTG=1 (b) | | | Wk+1 | | Wk+2 | | Wk+3 | | Wk+4 | |
| | INTG=2 (c) | | | Wk+1 | | Wk+2 | | Wk+3 | | Wk+4 | |
| | INTG=3 (d) | | | Wk+1 | | Wk+2 | | Wk+3 | | Wk+4 | |
| | INTG=4 (e) | | | Wk | | Wk+1 | | Wk+2 | | Wk+3 | |
| LD | | | ⎡⎤ | | | | | | | ⎡ | |
| SLC | INTG=0 (f) | | 0 | | | 6 | | 5 | | | |
| | INTG=1 (g) | | 0 | | | 6 | | 4 | | | |
| | INTG=2 (h) | | 0 | | | 6 | | 3 | | | |
| | INTG=3 (i) | | 0 | | | 6 | | 2 | | | |
| | INTG≧4 (j) | | 0 | | | 6 | | 1 | | | |
| INTG≦3 (k) | DL2 | | | | | | | | | Wk+1 | |
| | REG1 So | | | | | | | | | | |
| | DL3 | | | | | | | | | | |
| INTG≧4 (l) | DL2 | | | | | | | | | Wk | |
| | REG1 So | | | | | | | | | | |
| | DL3 | | | | | | | | | | |

| CALCULATION CYCLE TIME SLOT | \multicolumn{8}{c}{$M_{i+3}$} |
|---|---|---|---|---|---|---|---|---|
| | 0 | 1 | 2 | 3 | 4 | 5 | 6 | 7 |
| SLC | | | 0 | | | 6 | | |

INTG=0 (a)

| | 0 | 1 | 2 | 3 | 4 | 5 | 6 | 7 |
|---|---|---|---|---|---|---|---|---|
| DL2 | $W_{k+1}$ | | $W_{k+2}$ | | $W_{k+3}$ | | $W_{k+4}$ | |
| REG1 SO | | | $W_{k+2}$ | $W_{k+3}$ | $W_{k+4}$ | 0 | | |
| DL3 | $W_{k-1}$ | $W_k$ | $W_{k+1}$ | $W_{k+2}$ | $W_{k+3}$ | $W_{k+4}$ | 0 | |
| REG2 X6 | $W_k$ | $W_{k+1}$ | $W_{k+2}$ | $W_{k+3}$ | $W_{k+4}$ | 0 | | |

INTG=1 (b)

| | 0 | 1 | 2 | 3 | 4 | 5 | 6 | 7 |
|---|---|---|---|---|---|---|---|---|
| DL2 | $W_{k+3}$ | | $W_{k+4}$ | | $W_{k+5}$ | | $W_{k+6}$ | |
| REG1 SO | | | $W_{k+4}$ | $W_{k+5}$ | $W_{k+6}$ | 0 | | |
| DL3 | $W_{k+1}$ | $W_{k+2}$ | $W_{k+3}$ | $W_{k+4}$ | $W_{k+5}$ | $W_{k+6}$ | 0 | $W_{k+1}$ |
| REG2 X5 | $W_{k+2}$ | $W_{k+3}$ | $W_{k+4}$ | $W_{k+5}$ | 0 | $W_k$ | $W_{k+1}$ | |

INTG=2 (c)

| | 0 | 1 | 2 | 3 | 4 | 5 | 6 | 7 |
|---|---|---|---|---|---|---|---|---|
| DL2 | $W_{k+5}$ | | $W_{k+6}$ | | $W_{k+7}$ | | $W_{k+8}$ | |
| REG1 SO | | | $W_{k+6}$ | $W_{k+7}$ | $W_{k+8}$ | 0 | | |
| DL3 | $W_{k+3}$ | $W_{k+4}$ | $W_{k+5}$ | $W_{k+6}$ | $W_{k+7}$ | $W_{k+8}$ | 0 | $W_{k+4}$ |
| REG2 X4 | $W_{k+4}$ | $W_{k+5}$ | $W_{k+6}$ | 0 | $W_{k+2}$ | $W_{k+3}$ | $W_{k+4}$ | |

INTG=3 (d)

| | 0 | 1 | 2 | 3 | 4 | 5 | 6 | 7 |
|---|---|---|---|---|---|---|---|---|
| DL2 | $W_{k+7}$ | | $W_{k+8}$ | | $W_{k+9}$ | | $W_{k+10}$ | |
| REG1 SO | | | $W_{k+8}$ | $W_{k+9}$ | $W_{k+10}$ | 0 | | |
| DL3 | $W_{k+5}$ | $W_{k+6}$ | $W_{k+7}$ | $W_{k+8}$ | $W_{k+9}$ | $W_{k+10}$ | 0 | $W_{k+7}$ |
| REG2 X3 | $W_{k+6}$ | $W_{k+7}$ | 0 | $W_{k+4}$ | $W_{k+5}$ | $W_{k+6}$ | $W_{k+7}$ | |

INTG=4 (e)

| | 0 | 1 | 2 | 3 | 4 | 5 | 6 | 7 |
|---|---|---|---|---|---|---|---|---|
| DL2 | $W_{k+8}$ | | $W_{k+9}$ | | $W_{k+10}$ | | $W_{k+11}$ | |
| REG1 SO | | | $W_{k+9}$ | $W_{k+10}$ | $W_{k+11}$ | 0 | | |
| DL3 | | | $W_{k+8}$ | $W_{k+9}$ | $W_{k+10}$ | $W_{k+11}$ | | |
| REG2 X3 | $W_{k+7}$ | 0 | | | | | | |

FIG. 14C

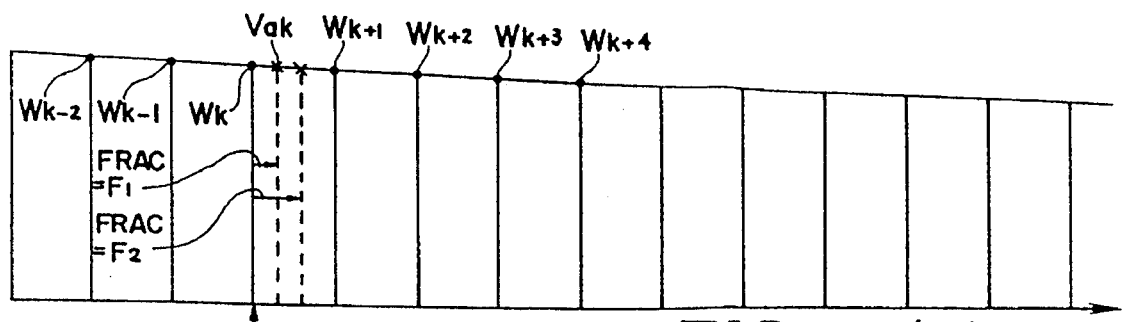
FIG.15(a) INTG=0
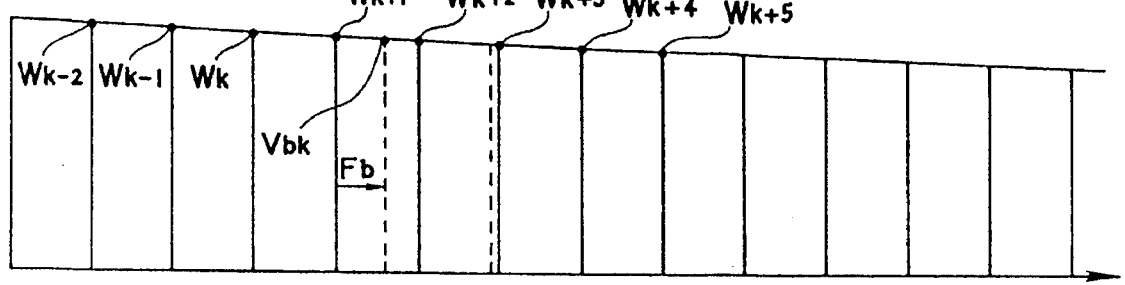
FIG.15(b) INTG=1
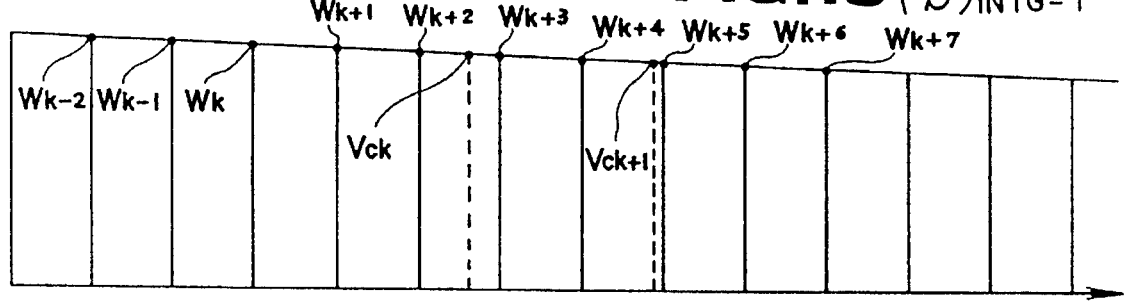
FIG.15(c) INTG=2
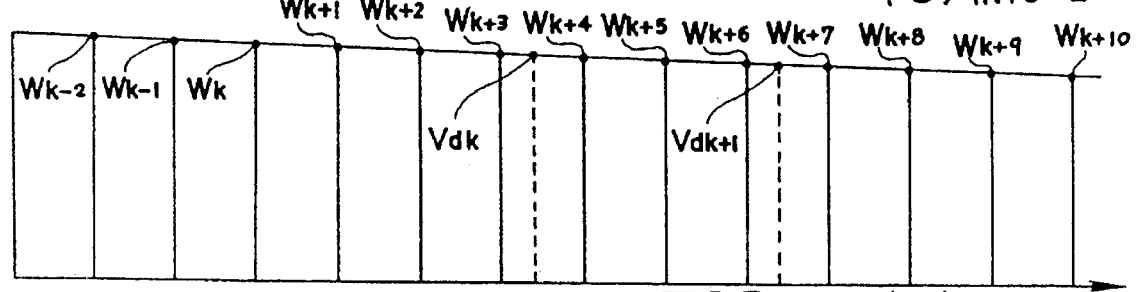
FIG.15(d) INTG=3
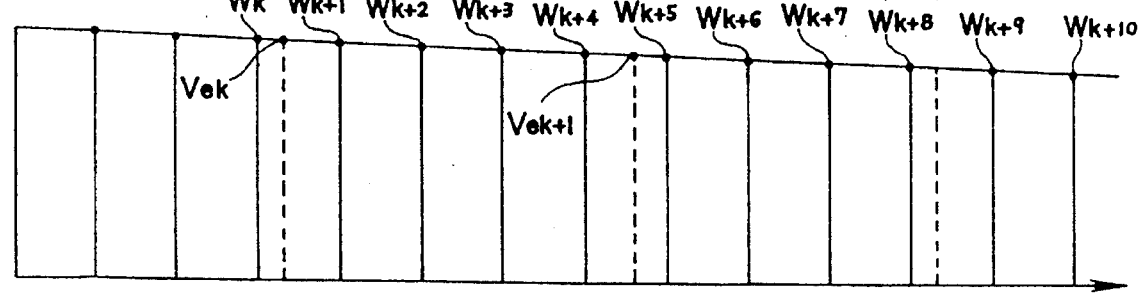
FIG.15(e) INTG=4

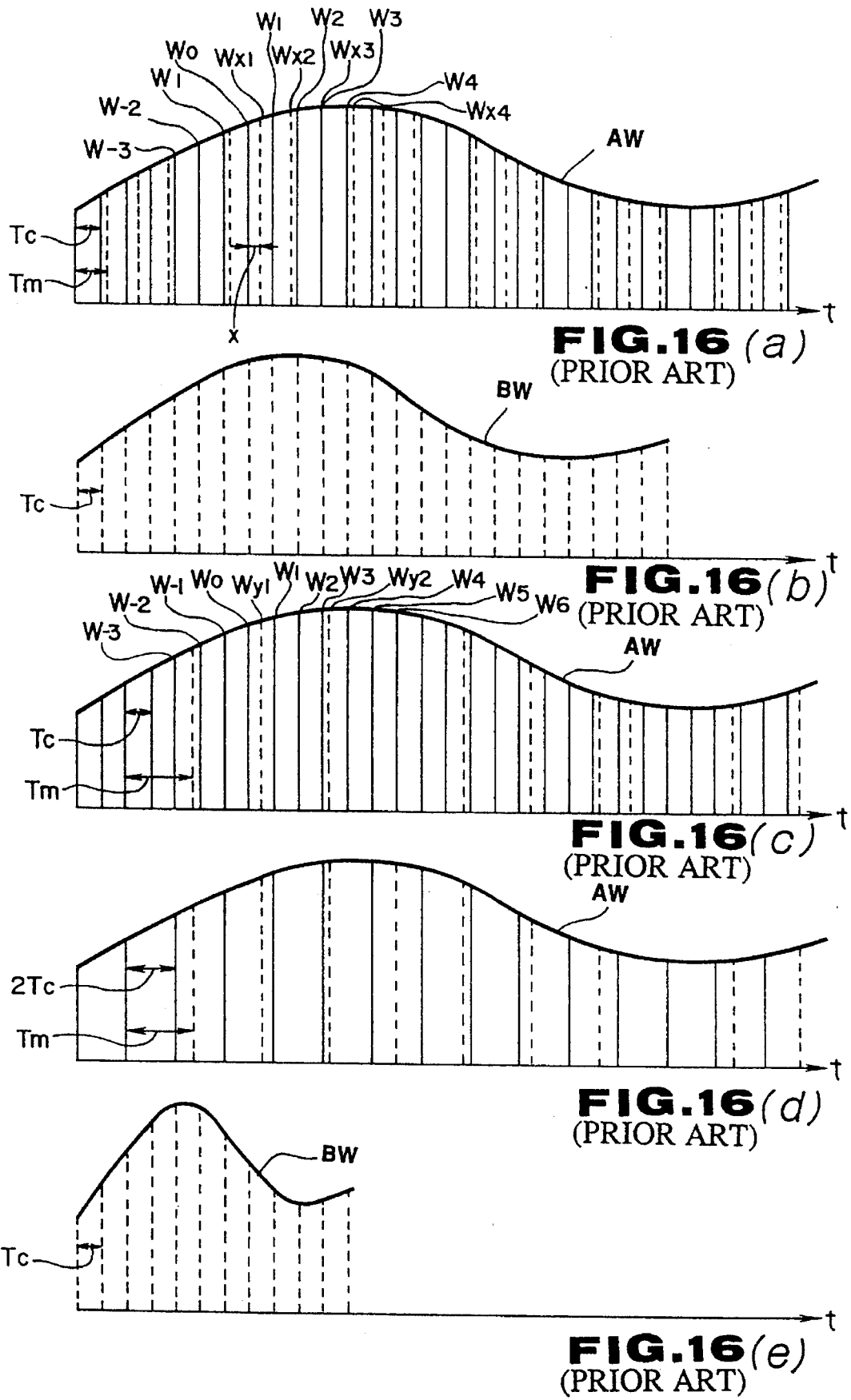

WAVEFORM GENERATING APPARATUS FOR MUSICAL INSTRUMENT

This is a continuation of application Ser. No. 07/620,826 filed Nov. 29, 1990, now abandoned.

BACKGROUND OF THE INVENTION

1. Field of the Invention

The present invention relates to a waveform generating apparatus which can be suitably employed in electronic musical instruments.

2. Prior Art

Two types of waveform generating apparatus are conventionally employed as tone generators for electronic musical instruments. In one such apparatus, sample data is stored therein representing various waveforms. To generate a particular pitch having a waveform equivalent to one of the stored waveforms, the corresponding waveform is cyclically read out from memory with a period equal to that of the pitch to be generated. Thus, for each waveform stored in the memory of the waveform generating apparatus, corresponding waveforms can be read out of the device at any desired pitch. Additionally, by carrying out various operations, for example, summing two or more waveforms which differ from those stored in memory can be generated.

In order to accurately control the pitch of a generated waveform, the period over which the waveform is read out from memory must be accurately controlled, generally based on the frequency of a system clock. Furthermore, this kind of waveform generating apparatus presents various design problems associated with the interface between the waveform apparatus and devices connected therewith. As an example, when summing two or more waveforms generated therein having different pitches, the waveforms to be summed will most likely be out of phases with respect to one another, thereby complicating the summing operation.

To solve this problem, another type of waveform generating apparatus has been conventionally employed, wherein sample data is generated in synchronization with a constant period, even as the-pitch of the waveform to be generated varies. Referring to FIGS. 16(a) through 16(e), the operation of this type of waveform generating apparatus will be described. In FIGS. 16(a), 16(c) and 16(d), AW indicates a basic waveform. This basic waveform is sampled over time at a constant sampling interval Tc, which will be referred to hereafter as basic sampling interval Tc. Thus, basic waveform A is sequentially sampled at basic sampling interval Tc, the result of which is stored as sample data in waveform memory.

When the target pitch of a waveform to be generated with this type of apparatus is higher than the pitch of basic waveform AW by an octave or less, the amplitude of basic waveform AW is sequentially determined over time at an interval given by Tm, hereafter referred to as regeneration sampling interval Tm, as indicated by the broken lines in FIG. 16(a), where regeneration sampling interval Tm has a duration greater than basic sampling interval Tc. Data having thus been obtained corresponding to sequential sampling waveform AW at an interval given by regeneration sampling interval Tm, the sample data is then sequentially outputted at an interval given by basic sampling interval Tc, thereby regenerating basic waveform AW as regenerated waveform BW, at a frequency equal to the frequency of basic waveform AW multiplied by Tm/Tc, such that the pitch of the tone corresponding to the regenerated waveform BW is equal to the desired target pitch.

It is frequently the case, however, that the ratio Tm/Tc is not an integral value, for which reason It is ordinarily not possible to read sample data corresponding to sequential sampling of waveform AW at regeneration sampling interval Tm directly from waveform memory with this type of apparatus. To solve this problem, an asynchronous waveform generating apparatus including an interpolating circuit is employed, whereby calculations are performed using the data stored in waveform memory obtained by sampling basic waveform AW over time at basic sampling interval TC, data is read out and supplied to the above mentioned interpolating circuit. Having been supplied to the interpolating circuit, the data values are then interpolated by the interpolating circuit therein, whereby theoretical sample data is obtained corresponding to sampling basic waveform AW at points on the time axis corresponding to multiples of regeneration sampling interval Tm.

As an example of this type of operation, as a first step, to determine the sample data corresponding to the single point $W_{x1}$ on the time axis shown in FIG. 16(a), 6th order interpolation is carried out using the sample data correlating with points $W_{-3}, W_{-2}, W_{-1}, W_0, W_1, W_2$ and $W_3$ on the time axis, where $W_{-3}, W_{-2}, W_{-1}$ and $W_0$ are the four multiples of basic sampling interval Tc immediately after $W_{x1}$ with respect to time, and where $W_1, W_2, W_3$ are the three multiples of basic sampling interval Tc immediately after $W_{x1}$ with respect to time. The sample data corresponding to these points on the time axis are read out from waveform memory and supplied to the interpolating circuit.

In the interpolating circuit which is included as a component of the asynchronous waveform generating apparatus, for each of the seven points, a corresponding interpolation coefficient is calculated based on the phase difference x between $W_{x1}$ and $W_0$, after which the sample data for each point is multiplied its corresponding interpolation coefficient and the results thus obtained are summed, whereby the sample data corresponding to point $W_{x1}$ is obtained. This process is then repeated to determine the sample data corresponding to the single point $W_{x2}$ on the time axis, this time carrying the interpolating operation using the sample data correlating with points $W_{-2}, W_{-1}, W_0, W_1, W_2, W_3$ and $W_4$ on the time axis, where $W_{-2}, W_{-1}, W_0$ and $W_1$ are the four multiples of basic sampling interval Tc immediately prior to $W_{x2}$, and where $W_2, W_3$ and $W_4$ are the three multiples of basic sampling interval Tc immediately after $W_{x2}$. The interpolation process as thus described is repeated over and over, thereby determining sample data corresponding to $W_{x1}, W_{x2}, W_{x3}, W_{x4}, W_{x5}, \ldots$ which are consecutive multiples of regeneration sampling interval Tm.

With each interpolating operation carried out as described above, six of the seven data used are also used in the following interpolation. Thus for example, of the sample data corresponding to $W_{-3}, W_{-2}, W_{-1}, W_0, W_1, W_2$ and $W_3$ used to calculate the sample the sample data corresponding to $W_{x1}$, the values corresponding to $W_{-2}, W_{-1}, W_0, W_1, W_2$, and $W_3$ will be used again in the next interpolation to calculate the sample data corresponding to $W_{x2}$. For the purpose of efficiency, therefore, a control routine is provided through the operation of which, sample data from waveform memory is temporarily stored in registers and then used in successive calculations. In this way, after $W_{x1}$ has been calculated, for example, to calculate the sample data corresponding to $W_{x2}$, only sample data corresponding to $W_4$ need be read out from waveform memory. For this reason, slower, less expensive memory devices can be successfully used for waveform memory.

When a waveform is to be regenerated having a pitch greater than one octave higher than that of the basic waveform AW, however, the requirements for high speed, fast access time memory devices cannot be so easily avoided by the above described method. As an example of such a case, in order to determine the sample data corresponding to point $W_{y1}$ in FIG. 16(c), interpolation is carried out using the sample data stored in waveform memory for points $W_{-3}$, $W_{-2}$, $W_{-1}$, $W_0$, $W_1$, $W_2$ and $W_3$. However, for the following interpolating operation, wherein the sample data corresponding to $W_{y2}$ is determined, interpolation is carried out using the sample data corresponding to $W_0$, $W_1$, $W_2$, $W_3$, $W_4$, $W_5$ and $W_6$. Thus, only three sample data values utilized in the first interpolating operation can be employed in the following interpolating operation. When a waveform is to be regenerated having a pitch two, three or more octaves higher than that of basic waveform A, access speed requirements for waveform memory become very significant, thereby necessitating the use of expensive, short access time memory devices.

In the view of the fact that, other than for pitch bending simulation, there is seldom need for capability to regenerate waveforms having a pitch more than two octaves higher than that of basic waveform AW, ordinarily, expensive, short access time memory devices are not utilized for waveform memory in this type of conventional waveform generating apparatus. When it becomes necessary to regenerate waveforms having a pitch much higher than that of basic waveform AW, interpolating operations are carried out using only one out of each two or three sample data values stored in waveform memory, thereby lessening requirements for access time memory devices therein. With the example shown in FIG. 16(d), only those sample data values which are multiples of two times basic sampling interval Tc, as indicated by solid vertical lines, are utilized in the interpolating operations. In FIG. 16(e), the resulting waveform is shown, regenerated by outputting the result of each sequential interpolating operation at a rate given by basic sampling interval Tc. By using the above described method, even waveforms having a pitch much higher than that of basic waveform AW can be regenerated, even without the use of expensive, short access time memory devices in the waveform memory. An example of this type of conventional waveform generating apparatus has been disclosed in Japanese Patent Application, Second Publication No. 59-17838.

With this type of conventional waveform generating apparatus, in order to regenerate a basic waveform at a different pitch with high fidelity, relatively high order interpolating computations must be carried out. However, as the order of interpolating computations become great, the rate at which sample data must be supplied from waveform memory increases. For this reason, order of interpolation in limited by the access time of the memory devices utilized in waveform memory. Thus, for the reasons described above, with this type of conventional waveform generating apparatus, the ability to regenerate with high fidelity waveforms having a pitch much higher that of the basic waveform is limited, unless expensive, short access time memory devices are employed in waveform memory.

Moreover, when decreasing waveform memory throughput requirements by the above described method of only using one sample data values out of every two or three for interpolating computations, there is a tendency for noise to be introduced into the regenerated waveform. In particular, when pitch bending operations are being carried out under the control of the individual operating the device, generally the ratio of the pitch of the regenerated waveform to that of the basic waveform varies in a linear manner. When the pitch corresponding to the regenerated waveform increases above a certain value, however, interpolating computations begin to skip one or two sample data values for every three such values as described above, for which reason a sudden change occurs in the spectrum of the regenerated waveform and the tone generated thereby, which is readily discernible by those listening.

SUMMARY OF THE INVENTION

In consideration of the above described shortcomings of conventional waveform generating devices, it is an object of the present invention to provide a waveform generating apparatus wherein waveforms can be regenerated accurately and with high fidelity over a wide range of pitches, while at the same time, eliminating the necessity for short access time memory devices in waveform memory, each when the pitch corresponding to the regenerated waveform is much higher than that of the basic waveform.

To achieve the above object, the present invention provides a waveform generating apparatus for calculating and generating regenerated sample data of a regenerated waveform having a desired pitch in synchronization with a constant regenerating sampling interval based on basic sample data which are sampled from a basic waveform by a predetermined basic sampling interval comprising:

a) phase generating means for generating phase data which designates a phase of said basic waveform;

b) operation mode control means for supplying a calculation designating data;

c) interpolating means for calculating said sample data of said regenerated waveform on the basis of said basic sample data and said phase data in accordance to a interpolating method which is designated by said calculation designating data.

Further objects and advantages of the present invention will become apparent by referring to the following description of the preferred embodiments of the present invention and the accompanying drawings.

BRIEF DESCRIPTION OF THE DRAWINGS

FIGS. 7A to 7C, 8A to 8C, 11, 12, 13A, 13B and 14A to 14C are time charts showing operations which are carried out by the preferred embodiment of the present invention shown in FIG. 1;

FIGS. 15(a) to 15(e) show a method in which current sample data of the regenerated waveform is generated by interpolation in the preferred embodiment of the present invention shown in FIG. 1;

FIGS. 16(a) to 16(e) show a prior art method for regenerating waveforms.

DETAILED DESCRIPTION OF THE PREFERRED EMBODIMENTS

Figure 1:
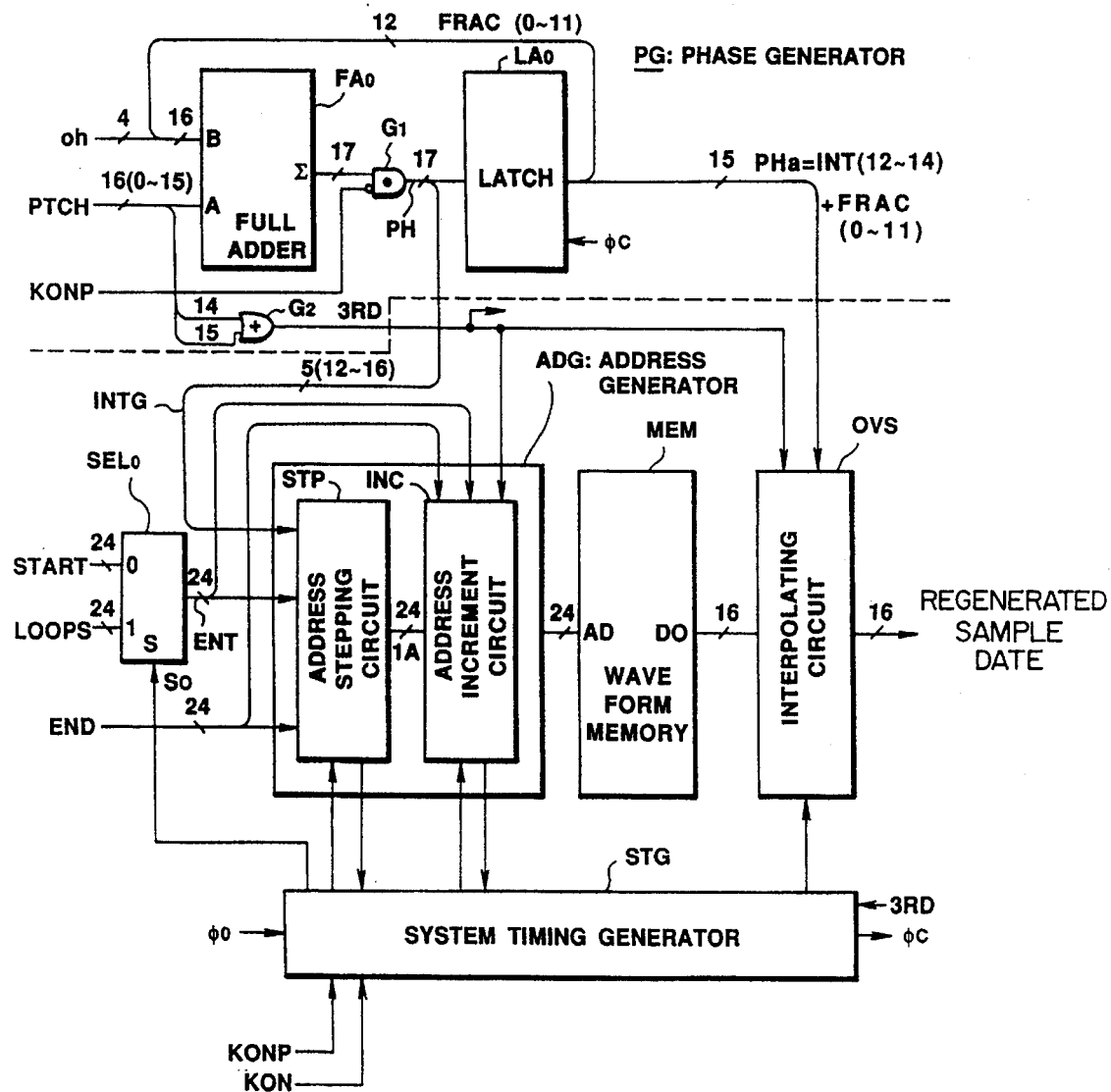
FIG. 1 is a block diagram showing a waveform generating apparatus according to a preferred embodiment of the present invention.

In the following, a first preferred embodiment of the present invention will be described with referring to the drawings. First of all, method of interpolation employed therein will be described with referring to FIGS. 2(a) and 2(b).

In the case where the pitch of the regenerated waveform is greater than the pitch of the basic waveform by 2 octaves or less, the current sample data $W_{x1}$ is calculated using 6th order interpolation on the basis of the previous 4 sample data $W_{-3}$, $W_{-2}$, $W_{-1}$, $W_0$ before the current data $W_{x1}$ and the following 3 sample data $W_1$, $W_2$, $W_3$ after the current sample data $W_{K1}$. In the case where the pitch of the regenerated waveform is greater than the pitch of the basic waveform by at least 2 octaves or more, the current sample data $W_{z1}$ to be regenerated is calculated using of 3-d order interpolation on the basis of the preceding sample data $W_0$ and the later 3 sample data $W_1$, $W_2$, $W_3$. In this manner, the order of the interpolating calculation is changed in response to the ratio between the pitch of the regenerated waveform and the pitch of the basic waveform so that the number of sample data to be read out from the waveform memory can be reduced when the pitch of the regenerated waveform is much higher than the pitch of the basic waveform. No skipping of sample data is involved, even if the the pitch of the regenerated waveform is much higher than the pitch of the basic waveform so that the regenerated waveform can be produced in high fidelity.

FIG. 1 is a block diagram showing the electronic configuration of the waveform generating apparatus according to the present invention. In FIG. 1, MEM designates waveform memory in which sample data for basic waveforms are stored. OVS designates an interpolating circuit which performs calculating on the sample data which are read out from waveform memory MEM. PG designates a phase generator which generates phase data designating the phase of the sample data to be regenerated. ADG designates an address generator which generates the address of sample data based on phase data generated by the phase generator PG, and supplies the address to the waveform memory MEM. $SEL_0$ designates a selector which selects data to be inputted to the address generator ADG. STG designates a system timing generator. In the following, the above mentioned elements will be described.

<System timing generator STG>

Figure 3:
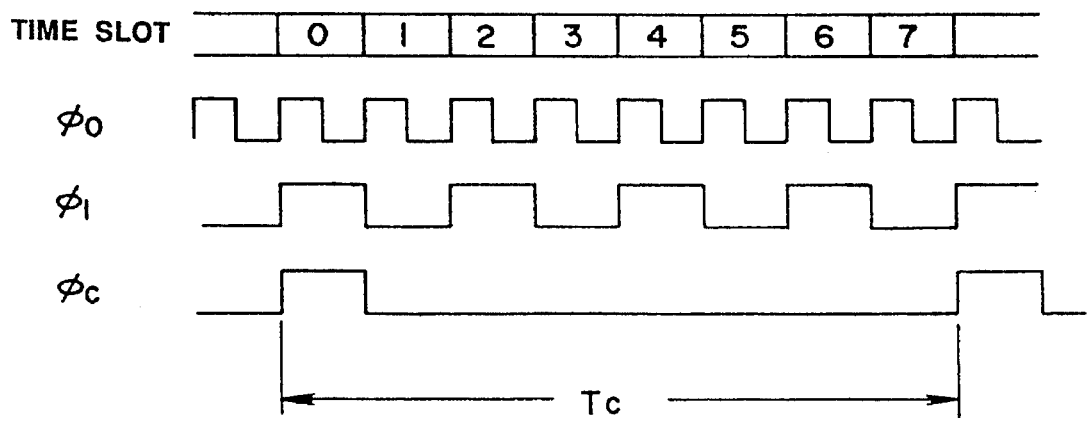
FIG. 3 is a time chart showing control signals which are generated and used by the preferred embodiment of the present invention shown in FIG. 1.

The system timing generator STG is supplied the system clock $\phi_0$ from a time base oscillator (not shown). In the system timing generator STG, by dividing the system clock $\phi_0$, controlling signals, for example, clocks $\phi_1$, $\phi_c$ and others which control the above mentioned elements are generated. As shown in FIG. 3, clock $\phi_1$ is ½ as fast as system clock $\phi_0$.

Clock $\phi_c$ is ⅛ as fast as system clock $\phi_0$. Further, the period of clock $\phi_c$ equals the time length of basic sampling interval Tc at which the basic waveform has been sampled.

In the waveform generating apparatus, the calculation of each sample data value is carried out in synchronization with clock $\phi_c$. Hereinafter, the period of clock $\phi_c$ will be referred to as a calculation cycle. In a calculation cycle, system clock $\phi_0$ produces 8 clock pulses. The calculation cycle is divided into time slots No.0 to No.7 each having an equal duration which is the time from beginning of one pulse of the system clock $\phi_0$ to the beginning of the next.

<The phase generator PG>

The phase generator PG includes a full adder $FA_0$, an AND circuit $G_1$, a latch $LA_0$ and an OR gate $G_2$. Pitch data PTCH designating the ratio Tm/Tc is inputted at input terminal A of the full adder $FA_0$. More specifically, plural pitch data PTCH corresponding to plural key-codes are stored in ROM (not shown). When a key of the key-board (not shown) is depressed, the pitch data corresponding to the key-code of the depressed key is read out from ROM, and is supplied to the full adder $FA_0$. In addition, when the pitch bend input device (not shown) is manipulated, the pitch data PTCH is modified in response to the manipulating of the pitch bend input device.

The pitch data PTCH consists of 16 bits. In the pitch data PTCH, the upper 4 bits ( No. 12 bit to No. 15 bit) designate the integral portion of the pitch ratio Tm/Tc and the lower 12 bits (No.0 bit to No.11 bit) designate the fractional portion of the ratio Tm/Tc. The 16 bits data consisting of the upper 4 bits which are set to 0h ("h" indicates the hexadecimal coding) and the lower 12 bits which are the lower 12 bits of the output data of the latch $LA_0$, i.e. the fractional portion of the output data of latch $LA_0$, are inputted at input terminal B of the full adder $FA_0$. The summation of the pitch data PTCH and the fraction of the output data of the latch $LA_0$ is calculated by full adder $FA_0$. The result of the summation is outputted by full adder $FA_0$ as 17 bits wide data.

The AND circuit $G_1$ provides 17 AND gates. The first input terminal of each AND gate is supplied a respective bit of the output of full adder $FA_0$. In addition, each AND gate outputs the data which has been inputted at its first input terminal when level "0" signal is inputted at its second input terminal. When any key of the key-board (not shown) is depressed, the key-on signal KON (level "1") is generated to indicate that the key is in the on-state. In addition, the key-on pulse KONP (level "1") is generated during the first calculating cycle after the key-on signal KON. The key-on pulse KONP is inputted at each of the second input terminals of the 17 AND gates. Thus, the data of which all bits are at "0" are outputted from the AND circuit $G_1$ and inputted to the latch $LA_0$ during the first calculating cycle after the key-on timing. After the ending of the first calculating cycle, the data of the full adder $FA_0$ is inputted to the latch $LA_0$ via the AND circuit $G_1$ as the phase data PH.

The phase data PH outputted from the AND circuit $G_1$ is supplied to latch $LA_0$. When the calculation cycle is changed and the clock $\phi_c$ is raised, the phase data PHa which is stored in the latch $LA_0$ and is older than the phase data PH by one calculating cycle is updated by the phase data PH. The lower 12 bits of the phase data PHa, i.e. the fraction of the phase data PHa is supplied to the input terminal B of the full adder $FA_0$ as mentioned above.

The OR gate $G_2$ carries out the OR operation of the MSB (No. 15 bit) of the pitch data PTCH and No. 14 bit of the pitch data PTCH. The result of the OR operation is outputted from the OR gate $G_2$ as a pitch judgement data 3RD. In the case where the pitch data PTCH is equal or less than [3], the pitch judgement data 3RD will be "0". In the case where the pitch data PTCH is equal or greater than [4], the pitch judgement data 3RD will be "1".

<The address generator ADG>

Figure 2:
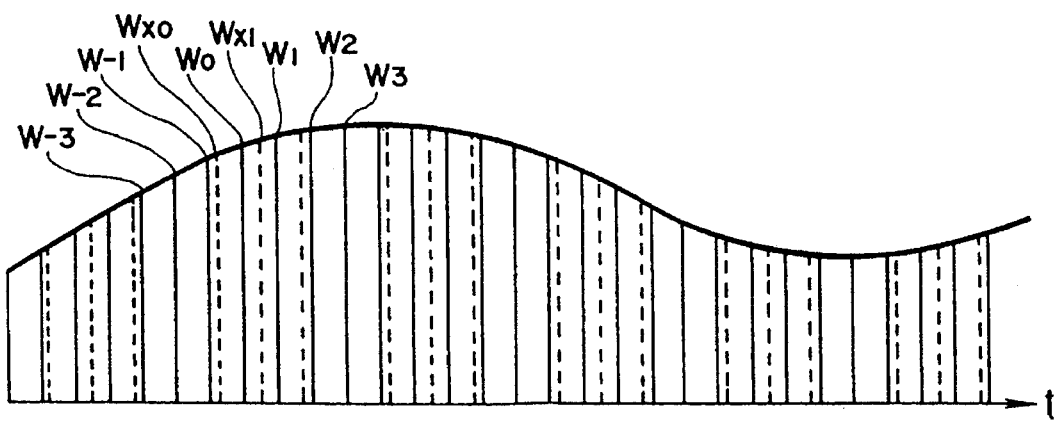
FIGS. 2(a) and 2(b) show a method of interpolation which is carried out by the preferred embodiment of the present invention shown in FIG. 1.
Figure 2:
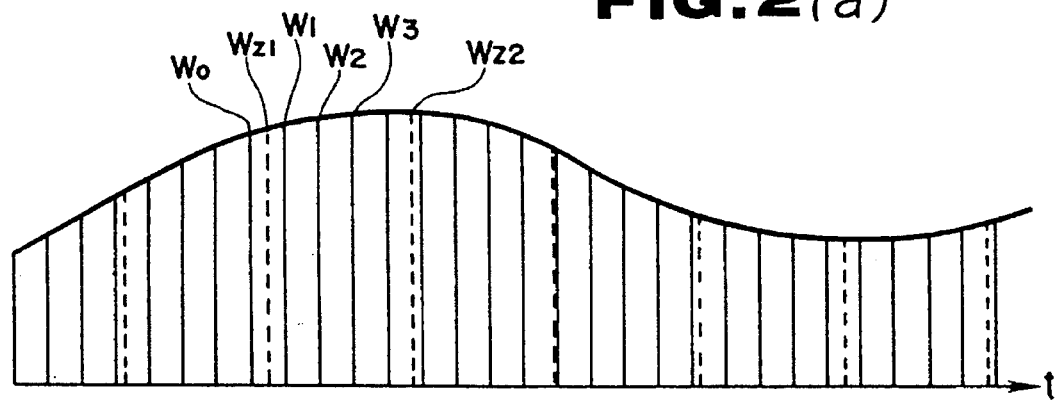

The address generator ADG provides an address stepping circuit STP and an address increment circuit INC. The address stepping circuit STP generates the sample address of the waveform memory MEM in which the preceding sample data before the current sample data, i.e. the sample data corresponding to the sample $W_0$ shown in FIGS. 2(a) and 2(b) is stored. Hereinafter, such sample address will be called the basic sample address IA. The address increment circuit INC generates the sample address of the sample data which continues after the basic sample data addressed in the basic sample address IA.

The data consisting of the upper 5 bits of the 17 bits of phase data PH, i.e. the integer of the phase data PH is inputted to address stepping circuit STP as the basic address update data INTG. In every calculating cycle, the basic sample address IA is updated on the basis of the basic address update data INTG. In addition, a start address START and a loop starting address LOOPS are inputted to the selector $SEL_0$. The address selected by the selector $SEL_0$ is inputted to the address stepping circuit STP as the data ENT. Further, an ending address END is inputted to the address stepping circuit STP.

Figure 4:
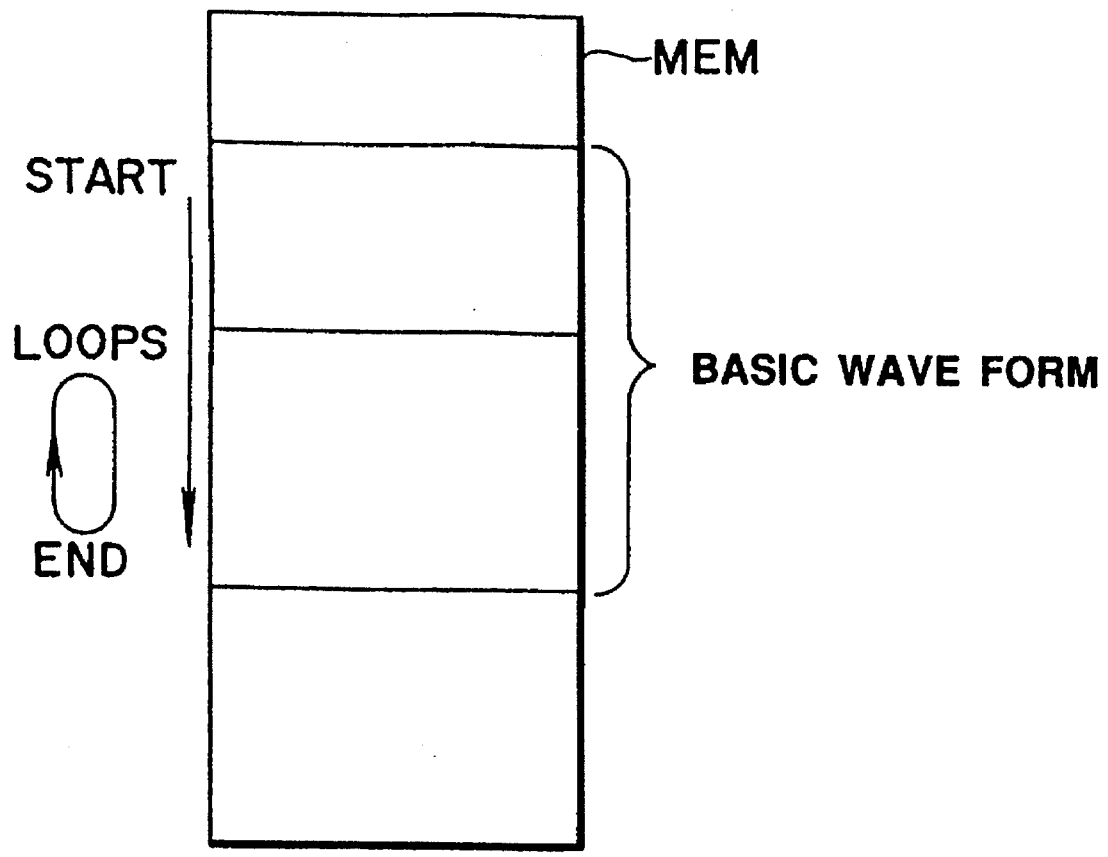
FIG. 4 shows a method of which sample data are read out from a waveform memory which is provided in the preferred embodiment of the present invention shown in FIG. 1.

Herein, the description will be given with respect to the starting address START, the loop starting address LOOPS and the ending address END. In the waveform memory MEM, the sample data of the basic wave corresponding to a tone color are stored as shown in FIG. 4. When a tone color designating device (not shown) is operated, the starting address START, the loop starting address LOOPS and the ending address END corresponding to the designated tone color are outputted as the waveform parameters. First, the sample data stored in the area corresponding to the starting address START is read out. Incrementing the read out address, the sample stored in the area corresponding to the read out address is read out, until the read out address reaches the ending address END. When the sample data addressed in the ending address END is read out, the next read out address is set to the loop starting address LOOPS. Thereafter, incrementing the read out address from the loop starting address LOOPS to the ending address repeatedly, the sample data stored the area corresponding to the read out address is read out. The starting address START, the loop starting address LOOPS and the ending address END are all 24 bits data which is the same bit size of the address of the waveform memory MEM.

Figure 5:
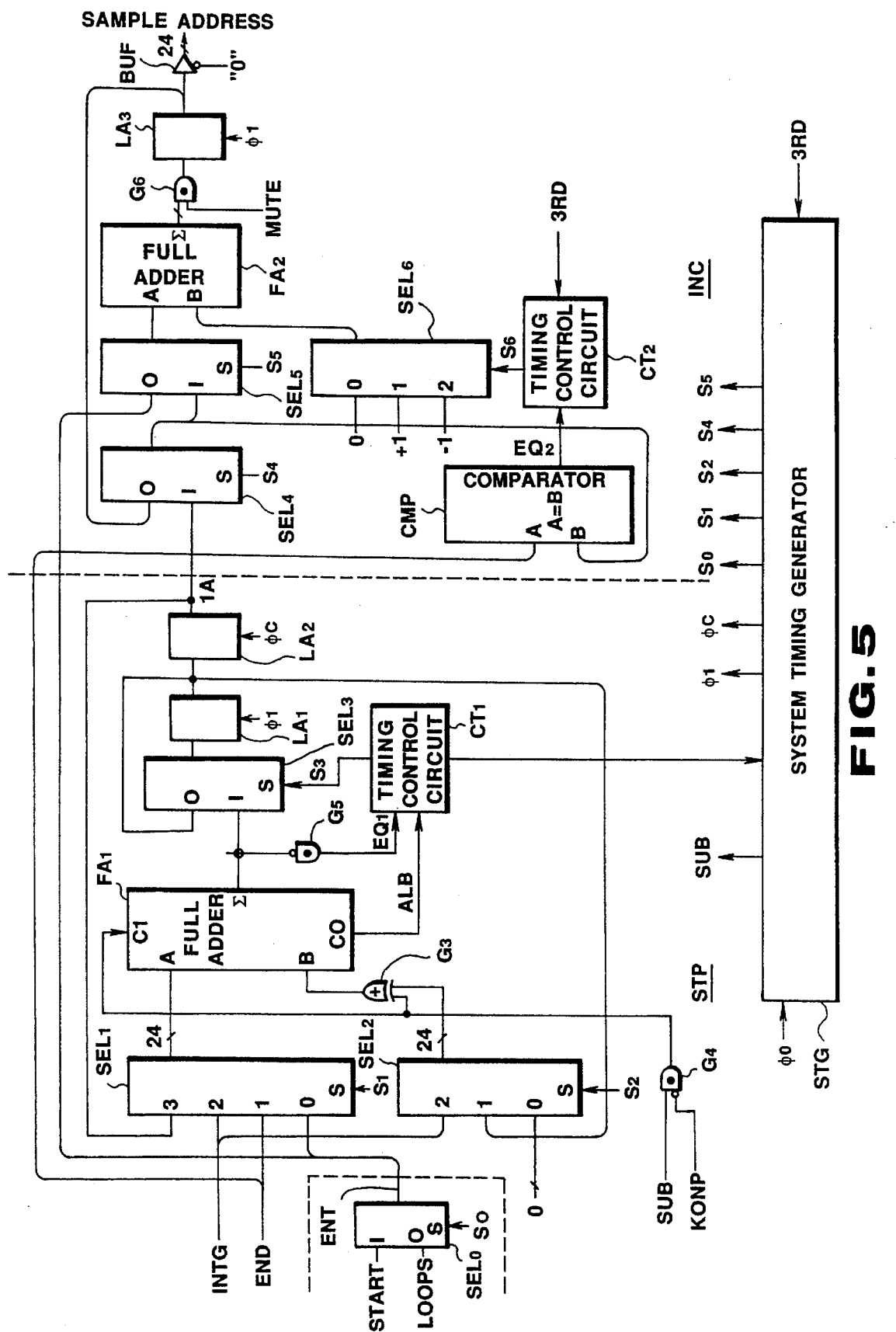
FIG. 5 is a block diagram showing details of the configuration of an address generator which is provided in the preferred embodiment of the present invention shown in FIG. 1.

Referring to FIG. 5, a description of the configuration of the address generator ADG is given. First, the description will be given with respect to the address stepping circuit STP. In the selector $SEL_1$, the input terminal No.0 is provided the output data of the selector $SEL_0$, the input terminal No.1 is provided the ending address END, the input terminal No.2 is provided the basic sample address update data INTG and the input terminal No.3 is provided the output data of the latch $LA_2$. Further, the selecting input terminal S of the selector $SEL_1$ is provided the selection designating signal $S_1$ which is supplied from the system timing generator STG. The input data is selected and outputted by the selector $SEL_1$ in response to the selection designating signal $S_1$. In the selector $SEL_2$, the input terminal No.0 is provided the fixed data [0], the input terminal No.1 is provided the output data of the latch $LA_1$ and the input terminal No.2 is provided the basic sample address update data INTG. Further, the selecting input terminal of the selector $SEL_2$ is supplied the selection designating signal $S_2$ from system timing generator STG. The input data is selected and outputted by the selector $SEL_2$ in response to the selection designating signal $S_2$.

The AND gate $G_4$ is provided the subtraction designating signal SUB at its positive true logic input terminal and is provided the key-on pulse KONP to its negative true logic input terminal. The XOR circuit $G_3$ consists of 24 XOR gates. The first input terminal of each AND gate is provided the each bit of the 24 bit width data outputted from the selector $SEL_2$. The second input terminals of 24 XOR gates are provided the same data outputted from the AND gate $G_4$. Thus, the XOR operation of the data outputted from the selector $SEL_2$ and the data outputted from the AND gate $G_4$ is carried out by the XOR circuit $G_3$. The 24 bit width output data of the XOR circuit $G_3$ is inputted at input terminal A of the full adder $FA_1$. In addition, the output data of the AND gate $G_4$ is provided to the carry input terminal CI of the full adder $FA_1$.

The output data of the full adder $FA_1$ is inputted at input terminal No.1 of the selector $SEL_3$. In addition, all bits of the output data of the full adder $FA_1$ are inputted to the AND gate $G_5$ of which the input terminals are all negative true logic. When all bits of the output data of the full adder $FA_1$ are at "0", the output data $EQ_1$ of the AND gate $G_5$ will be at "1". The timing control circuit $CT_1$ supplies the selection designating signal $S_3$ to the selector $SEL_3$ being controlled by the system timing generator STG. In addition, when the carry flag CO of the full adder $FA_1$ becomes "1" or the output data $EQ_1$ of the AND gate $G_5$ is "1", such information is supplied to the system timing generator STG, and the system timing generator controls the subtraction designating signal SUB.

The output data of the selector $SEL_3$ is stored in the latch $LA_1$ in synchronization with clock $\phi_1$. The output data of latch $LA_1$ is inputted at input terminal No.0 of the selector $SEL_3$ and also is inputted at input terminal No.1 of the selector $SEL_2$. The output data of the latch $LA_1$ is stored in latch $LA_2$ in synchronization with the clock $\phi_c$, the stored data being held during one calculating cycle as the basic sample address IA.

Next, the address increment circuit INC provides selectors $SEL_4$ to $SEL_6$, a full adder $FA_2$, AND circuit $G_6$, latch $LA_3$, 3-state buffer BUF, comparison circuit CMP and a timing control circuit $CT_2$. The input terminal No.0 of the selector $SEL_4$ is provided the output data of the latch $LA_3$. The input terminal No.1 of the selector $SEL_4$ is provided the output data of the latch $LA_2$. The selector $SEL_4$ selects one of the 2 input data as the output data based on the selection designating signal $S_4$ supplied from the system timing generator STG. The input terminal No.0 of the selector $SEL_5$ is supplied the output data of the selector $SEL_0$ which selects one of the starting address START and the loop starting address LOOPS as the output data. The input terminal No.1 of the selector $SEL_5$ is supplied the output data of the selector $SEL_4$. The selector $SEL_5$ selects one of the 2 input data as the output data based on the selection designating signal $S_5$ supplied from the system timing generator STG.

The comparison circuit CMP compares the output data of the selector $SEL_4$ with the ending address END. The comparison circuit CMP outputs the equality detection signal EQ (level "1" signal) when the output data of the selector $SEL_4$ equals to the ending address END. The timing control circuit $CT_2$ control the selection designating signal $S_6$ based on the equality detection signal EQ. The selector selects one of [0], [+1] and [−1] as the output data in response to the selection designating signal $SEL_6$.

The input terminal B of the full adder $FA_2$ is supplied the output data of the selector $SEL_6$. The input terminal A of the full adder $FA_2$ is supplied the output data of the selector $SEL_5$. The output data of full adder $FA_2$ and a mute signal MUTE are both input to an AND circuit $G_6$ consisting of plural AND gates corresponding to the bit size of the output data of full adder $FA_2$. The mute signal MUTE is raised to "1" at the time of starting the second calculation cycle after key-on timing and falls to "0" at key-off timing.

The output data of the AND circuit $G_6$ is written to the latch $LA_3$ in synchronization with the clock $\phi_1$. The output data of the latch $LA_3$ is inputted at the selector $SEL_4$ as above mentioned, further supplied to the waveform memory MEM as the sample address for the interpolation via buffer BUF.

<The interpolating circuit OVS>

Figure 6:
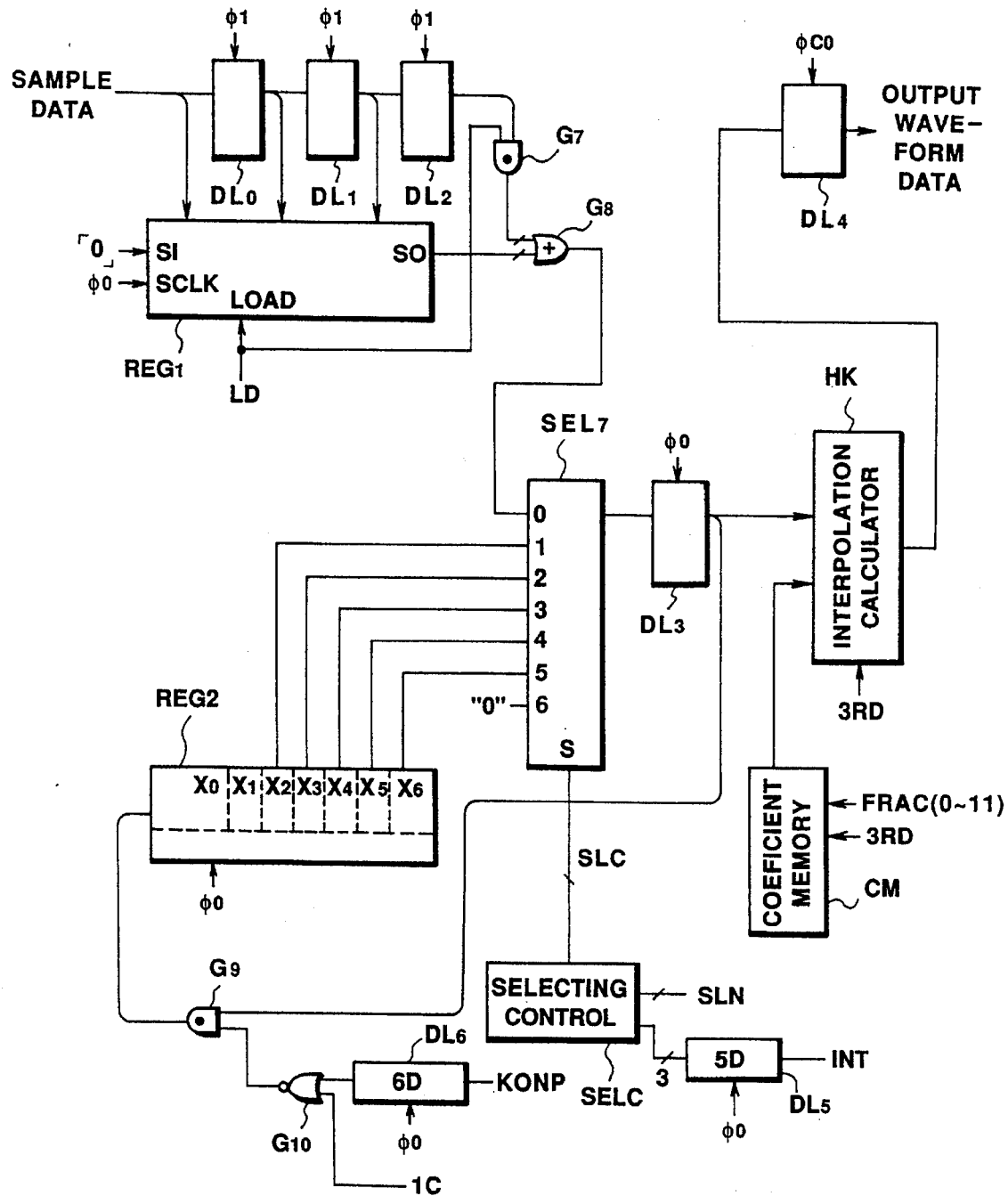
FIG. 6 is a block diagram showing details of the configuration of an interpolating circuit which is provided in the preferred embodiment of the present invention shown in FIG. 1.

As shown in FIG. 6, the interpolating circuit provides registers $DL_0$ to $DL_6$, shift registers $REG_1$ and $REG_2$, a selector $SEL_7$, AND circuits $G_7$ and $G_9$, an OR circuit $G_8$, a NOR gate $G_{10}$, an interpolation calculator HK, a coefficients memory CM and a selecting control circuit SELC.

The read out sample data from waveform memory MEM is shifted in the registers $DL_0$ to $DL_2$ in synchronization with clock $\phi_1$. The output data of the register $DL_2$ and load signal LD generated by the system timing generator STG are both inputted at AND circuit $G_7$. In addition, the load signal LD is inputted at shift register $REG_1$ as a mode changing signal which changes the operation of the shift register $REG_1$ to parallel loading mode or serial shifting mode. When the load signal LD is asserted, the read out data of the waveform memory MEM and the output data of the registers $DL_0$ and $DL_1$ are respectively parallel loaded into the stages of register $REG_1$ in synchronization with clock $\phi_0$. When the load signal LD is negated, serial shifting operation is carried out in the register $REG_1$ in synchronization with the clock $\phi_0$, and shifted data is sequentially outputted from the serial output terminal SO of the register. Herein, the serial input terminal SI of the shift register $REG_1$ is supplied a fixed data [0]. Thus, the data [0] is outputted from the serial output terminal SO after all of the parallel loaded data are outputted in serial manner. The OR operation of the serial output data of the shift register $REG_1$ and the output data of the AND circuit $G_7$ is carried out by the OR circuit $G_8$. The output data of the OR circuit $G_8$ is inputted at input terminal No.0 of the selector $SEL_7$.

The output data of the selector $SEL_7$ is written to the register $DL_3$ in synchronization with the clock $\phi_0$. The output data of the register $DL_3$ is inputted at the interpolation calculator HK, and further inputted at AND circuit $G_9$.

The coefficient memory CM consists of a first area and second area for storing the interpolation coefficients. The coefficients corresponding to third order interpolation are stored in the first area, while the coefficients corresponding to the 6th order interpolation are stored in the second area. The area from which the coefficients will be read out is designated by the pitch judgement data 3RD which is supplied from the phase generator PG. In the case where the pitch judgement data 3RD="0", the first area is selected, and a group of coefficients corresponding to the fraction FRAC of the phase data PH is read out from the first area for 6th order interpolation. In the case where the pitch judgement data 3RD="1", a group of coefficients corresponding to the fraction FRAC of the phase data PH is read out from the second area for third order interpolation. The coefficients read out from the coefficient memory CM are supplied to the interpolation calculator HK.

In the interpolation calculator HK, the supplied data from the register $DL_3$ is sequentially multiplied by the coefficient which is sequentially read out from the coefficient memory CM. In addition, the summation of the multiplication result is carried out. The summation result of the interpolation calculator HK is written to the register $DL_4$ in synchronization with the clock $\phi_{ca}$ which is asserted at the time slot No. 7 of every calculation cycle. The stored data in the register $DL_4$ is outputted as the sample data of the regenerated waveform. The configuration of this kind of interpolation calculator and the interpolating algorithm have been disclosed in Japanese Patent Application, Second Publication No. 59-17838 and Japanese Patent Application, Laid-Open Publication No. 63-168695.

AND circuit $G_9$ cattles out the AND operation of the output data of the register $DL_3$ and the output data of NOR gate $G_{10}$. The first input terminal of NOR gate $G_{10}$ is supplied the initial clear signal IC. In addition, the second input terminal of the NOR gate $G_{10}$ is supplied the output data of the register $DL_6$ which has 6 stages and delay the key-on pulse KONP by the 6 pulses of clock $\phi_0$.

The output data of AND circuit $G_9$ is inputted at stage No.0 of the 7-stage shift register $REG_2$ in synchronization with the clock $\phi_0$. The input data of stage No.0 is shifted to stages No. 1 to No. 6 in synchronization with the clock $\phi_0$. The output data $X_2$ to $X_6$ outputted from stages No.2 to No.6 of the register $REG_2$ are respectively inputted at input terminals No. 1 to No. 5 of selector $SEL_7$. Herein, Input terminal No. 6 of selector $SEL_7$ is supplied a fixed data [0]. The above mentioned initial clear signal IC is set to "1" during the predetermined time after power-on of the musical instrument. Consequently, all of the stages of the shift register $REG_2$ are initialized to "0". Further, when a key-on event occurs, all of the stages of the shift register $REG_2$ are initialized by the key-on pulse KONP.

The selecting control circuit SELC controls the selecting signal $S_7$ for controlling the input selection of the selector $SEL_7$ on the basis of the timing signal SLN which is outputted from the system timing generator STG and the data INT which consists of the No.12 bit to No. 14 bit of the phase data PHa.

<Operation of the phase generator PC>

As shown in FIG. 7, when a key of the key-board (not shown) is depressed, the key-on signal KON and key-on pulse KONP are both raised to "1" at the beginning of time slot No.0 of the calculation cycle $M_1$ after the key-on event. Thereafter, the key-on signal KON maintains level "1" until the depressed key is released. In addition, the key-on pulse KONP maintains level "1" during calculation cycle $M_1$ so that the output data of the AND circuit $G_1$ i.e., the phase data PH is initialized to [0]. The data consisting of the bits No.0 to No.14 of the phase data PH (=[0]) is written to the latch $LA_0$ as the phase data PHa in synchronization with clock $\phi_c$ in the time slot No.0 of the next calculation cycle $M_2$. In addition, when beginning the calculation cycle $M_2$, the key-on pulse KONP falls to level "0" so that the AND circuit $G_1$ is enabled. The fraction FRAC of the phase data PHa is added with the pitch data PTCH by the full adder $FA_0$. The additional result of the full adder $FA_0$ Is outputted as the phase data PH via the AND circuit $G_1$. At the time slot No.0 of the next calculation cycle $M_3$, the data consisting of bits 0 to 14 of the phase data PH are stored in latch $LA_0$ as the updated phase data PHa. Thereafter, the phase data PH and PHa are updated on the basis of the pitch data PTCH during every calculation cycle as mentioned above.

While the above mentioned operation is carried out, the integer of the phase data PH is supplied to address stepping circuit STP as the basic address update data INTG. In addition, both integer INT and fraction FRAC which consists of the phase data PHa are supplied to the interpolation circuit OVS.

<Operation of the address generator ADG>

Starting address START, loop starting address LOOPS and ending address END which all correspond to the designated tone color are supplied the address generator ADG. When any key of the key-board is depressed, address generator ADG generates the basic sample address IA on the basis of the basic sample address update data INTG supplied from the phase generator PG, and further generates the predetermined number of sample addresses following after the basic sample address. The address generating operation is carried out in response to pitch judgement data 3RD as follows.

(a) pitch judgement data 3RD="0"

Figure 7A:
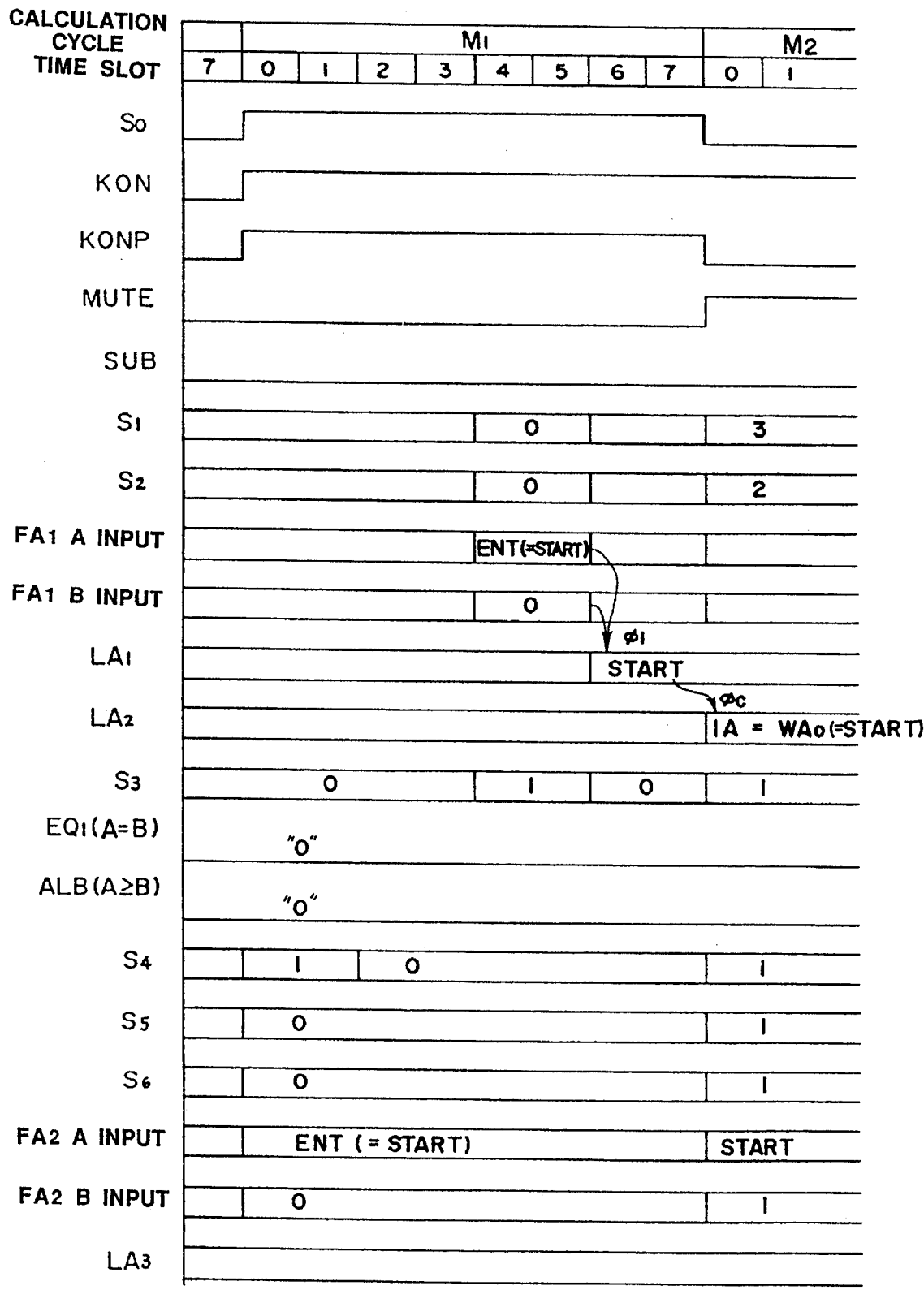

First, referring to FIGS. 7A and 7B, the description will be given with respect to the operation in the case where the pitch judgement data 3RD="0" i.e., the pitch data PTCH is less than [4].

During the calculation cycle $M_1$ after the key-on timing, the selection designating signal $S_O$ is set to [1]. In addition, during time slots No.4 and No.5 of the calculation cycle $M_1$, selection designating signals $S_1$ and $S_2$ are both set to [0]. Further, the selection designating signal $S_3$ is set to [1]. Consequently, the starting address START is inputted at terminal A of the full adder $FA_1$ via the selectors $SEL_0$ and $SEL_1$, and fixed data [0] is inputted at terminal B of full adder $FA_1$ via selector $SEL_2$ and XOR circuit $G_3$. In a result, the starting address START is outputted from the full adder $FA_1$. The output data of the full adder $FA_1$ (=START) is written to the latch $LA_1$ in synchronization with clock $\phi_1$ in the slot time No.6. Further, at the beginning of time slot No.6, the selection designating signal $S_3$ is changed to [0] so that the latch $LA_1$ holds the starting address START thereafter. The selection designating signal $S_O$ is changed to [0] when the calculation cycle $M_1$ is ended. In addition, the mute signal MUTE maintains the level "0" during the calculation cycle $M_1$ so that the latch $LA_3$ holds a data [0].

At the time slot No.0 of the next calculation cycle $M_2$, the starting address START stored in the latch $LA_1$ is written to the latch $LA_2$ in synchronization with the clock $\phi_c$. The latch $LA_1$ holds the starting address START as the primary basic sample address IA (=$WA_0$=START) during the calculation cycle $M_2$. Further, at the beginning of time slot No.0 of calculation cycle $M_2$, the selection designating signals $S_4$, $S_5$ and $S_6$ are all changed to [1] and the AND circuit $G_6$ is enabled by the mute signal MUTE which is changed to "1" at this time. Consequently, the basic sample address IA (=$WA_0$) is inputted at terminal A of the full adder $FA_2$ via the selectors $SEL_4$ and $SEL_5$, and also, a fixed data [1] is inputted at terminal B of the full adder $FA_2$ via the selector $SEL_6$. Thus, the full adder $FA_2$ outputs the address IA+1 (=$WA_0$+1) which is increased the basic sample address IA (=$WA_0$) by one. The address IA+1 is given to the latch $LA_3$ via the AND circuit $G_6$.

During the time slots No.0 and No.1 of the calculation cycle $M_2$, the selection designating signal $S_1$ is set to [3], the selection designating signal $S_2$ is set to [2] and the selection designating signal $S_3$ is set to [1]. Consequently, the basic sample address IA (=$WA_0$) stored in the latch $LA_2$ is inputted at terminal A of the full adder $FA_1$ via the selector $SEL_1$. Further, the basic address update data INTG is inputted at terminal B of the full adder $FA_1$ via the selector $SEL_2$. The addition of the basic sample address IA (=$WA_0$) and the basic sample address update data INTG is carried out by the full adder $FA_1$. The result of the addition IA+INTG (=$WA_0$+INTG) is outputted from the full adder $FA_1$ toward the latch $LA_1$ via the selector $SEL_3$.

At the time slot No.2 of the calculation cycle $M_2$, the current data IA+INTG (=$WA_0$+INTG) is stored in the latch $LA_1$. In addition, the data IA+1 (=$WA_0$+1) is stored in the latch $LA_1$ in synchronization with the clock $\phi_1$.

Furthermore, the selection designating signal $S_4$ is changed to [0] at the beginning of time slot No.2. In a result, the output data of the latch $LA_3$ ($WA_0$+1) is inputted at terminal A of the full adder $FA_2$ via the selectors $SEL_4$ and $SEL_5$, further, the fixed data [1] is inputted at terminal B of the full adder $FA_2$ via the selector $SEL_6$, so that the full adder $FA_2$ outputs the additional result ($WA_0$+2). The output data of the full adder $FA_2$ is written to the latch $LA_2$ in synchronization with the clock $\phi_1$ in the time slot No.4. Thereafter, until the time slot No.0 of the next calculation cycle $M_3$, the value stored in latch $LA_3$ is increased by one in synchronization with the clock $\phi_1$ as above mentioned. In this manner, 4 sample address IA+1, IA+2, IA+3 and IA+4 are generated on the basis of the basic sample address IA, and also are supplied to the waveform memory MEM via the buffer BUF.

In addition, the selection designating signals $S_1$ and $S_2$ are both set to [1] during the time slots No.2 and No.8, further, the subtraction designating signal SUB is set to "1". Consequently, the ending address END is inputted at terminal A of the full adder $FA_1$. Further, the output data ($WA_0$+INTG) of the latch $LA_1$ is selected by the selector $SEL_2$. Herein, the subtraction designating signal SUB is at "1" so that the carry input terminal CI of the full adder $FA_1$ is supplied the value of "1". The each bit of the output data of the selector $SEL_2$ ($WA_0$+INTG) is inverted by the XOR circuit $G_3$ so that the 1's complement of the data ($WA_0$+INTG) is outputted from the XOR circuit $G_3$ and inputted at input terminal B of the full adder $FA_1$. As a result, the subtraction END-($WA_0$+INTG) is carried out by the full adder. In this case, the subtraction result is positive data so that the output data $EQ_1$ of the AND gate $G_5$ and the output data ALB outputted from the the carry output terminal of the full adder $FA_1$ are both maintained at "0".

In the time slot No.0 of the next calculation cycle $M_3$, the data ($WA_0$+INTG) stored in the latch $LA_1$ is written to the latch $LA_2$ so that the basic sample address IA (=$WA_0$) is updated to $WA_1$ (=$WA_0$+INTG). Thereafter, during every calculation cycle, the basic sample address IA is updated by the address stepping circuit STP, and 4 sample addresses IA+1, IA+2, IA+3 and IA+4 are generated and supplied to the waveform memory MEM by the address increment circuit INC on the basis of the basic sample address IA. In addition, the comparison between the basic sample address IA and the ending address END is carried out every calculation cycle.

(b) In the case where the pitch judgement signal 3RD="1"

Figure 8A:
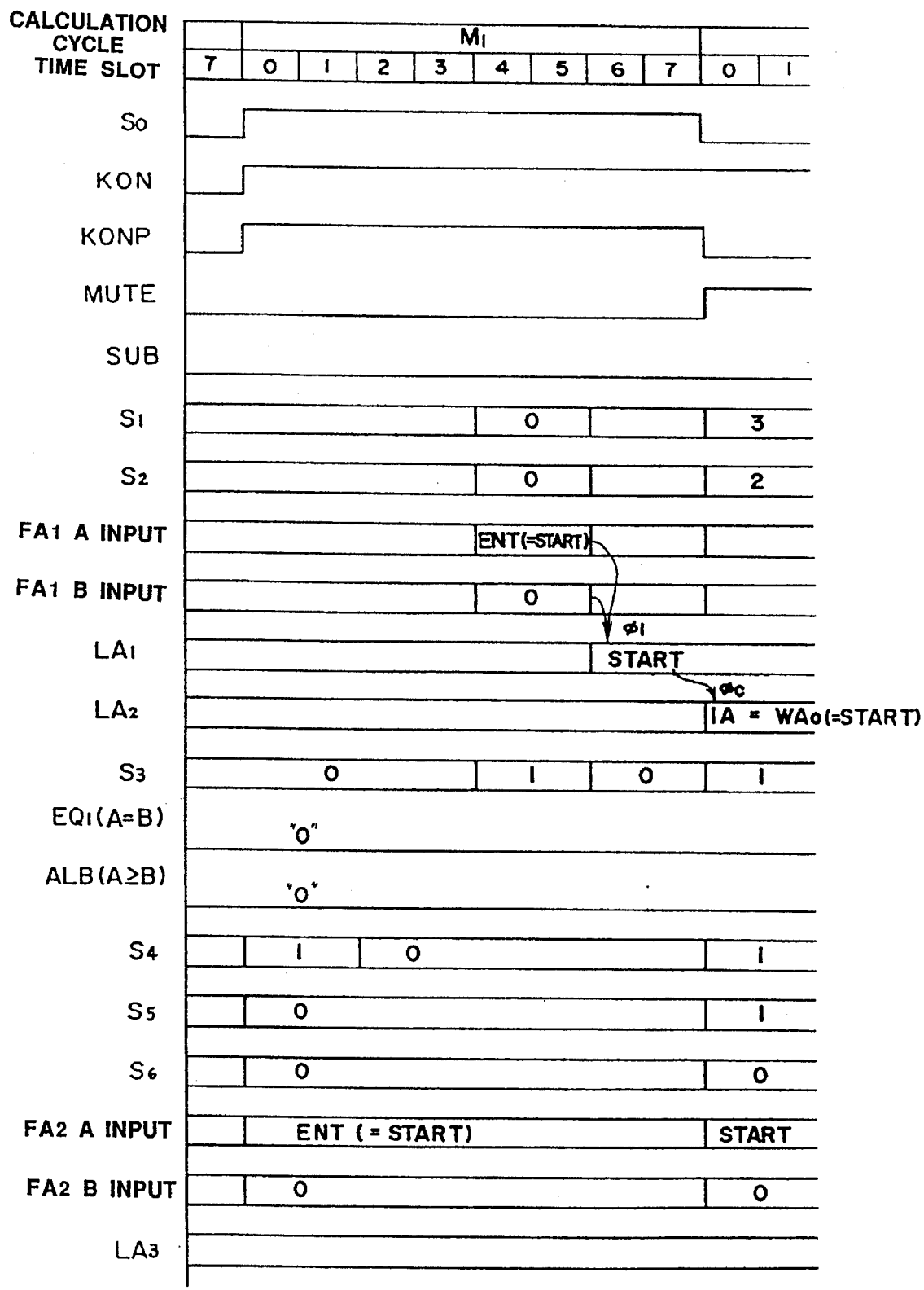

When the pitch data PTCH is more than [4], the pitch judgement signal 3RD will be "1". In this case, as shown in FIG. 8, the selection designating signal $S_6$ will be [0] during the time slot No.0 to No.1 and also will be [1] during the time slot No.2 to No.7 every calculating cycle after the calculation cycle $M_2$ which is the second calculating cycle after key-on timing. Thus, the input terminal A of the full adder $FA_2$ is inputted the basic sample address IA (in this case, IA=START) and the input terminal B of the full adder $FA_2$ is inputted a data [0] in the time slot No.0 of the calculation cycle $M_2$. The result of addition $WA_0$ (in this case, $WA_0$=START) outputted from the full adder $FA_2$ is written to the latch $LA_3$ in the time slot No.2. The output data of the latch $LA_3$ is supplied to the waveform memory via the buffer BUF.

During the time slots No.2 to No.7, the input terminal B of the full adder $FA_2$ is supplied with [1] so that the data stored in latch $LA_2$ is incremented sequentially. Thus, the sample address outputted from latch $LA_3$ and inputted to the waveform memory MEM is changed in synchronization with the change in time slots. More specifically, the sample address is $WA_0+1$ during the time slots No.4 to No.5, $WA_0+2$ during the time slots No.6 to No.7, $WA_0+3$ during the time slots No.0 to No.1 of the next calculation cycle $M_3$. Every calculation cycle after the calculation cycle $M_3$, the operation above mentioned is repeatedly carried out so that the sample address IA, IA+1, IA+2, IA+3 are sequentially generated and supplied to the waveform memory from time slot No.2 to time slot No.1 of the next calculation cycle.

<Loop-back address generation>

In the case where the sample address IA is close to the ending address END after updating the basic sample address IA, it will be necessary to change the address generation manner.

Figure 9:
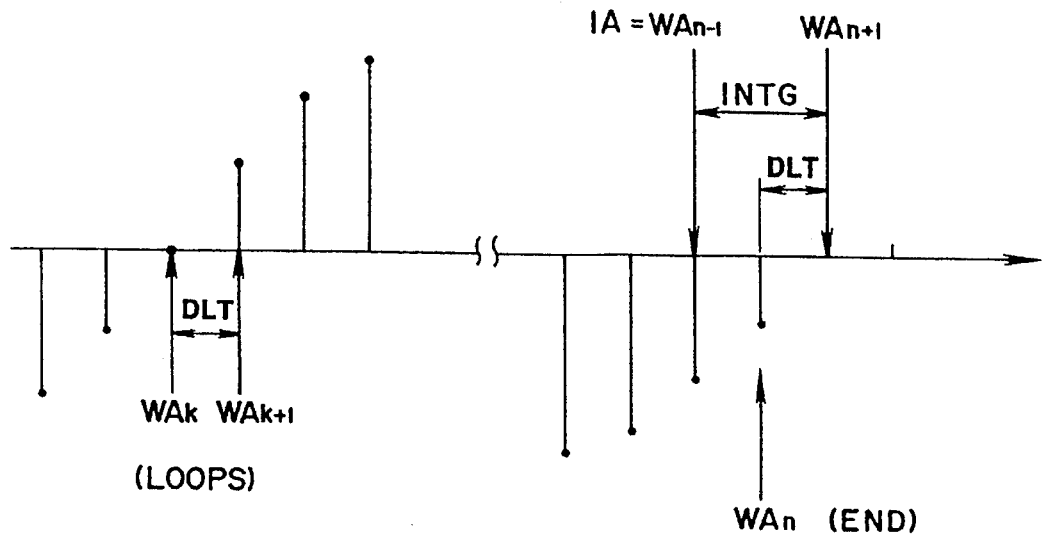
FIGS. 9 and 10 show a method of loop-back address generation which is carried by the preferred embodiment of the present invention shown in FIG. 1.

For example, in a calculation cycle $M_j$, the basic sample IA will be $WA_{n-1}$ which is less than the ending address END by [1] and the basic address update data INTG is, for example, [2]. In this case, as shown in FIG. 9, the additional result INTG+2 exceeds the ending address END. However, the basic sample address IA of the next calculation cycle $M_{j+1}$ must be the address which is greater than the loop starting address LOOPS by a data DLT corresponding to the difference between INTG+2 and the ending address END.

Figure 10:
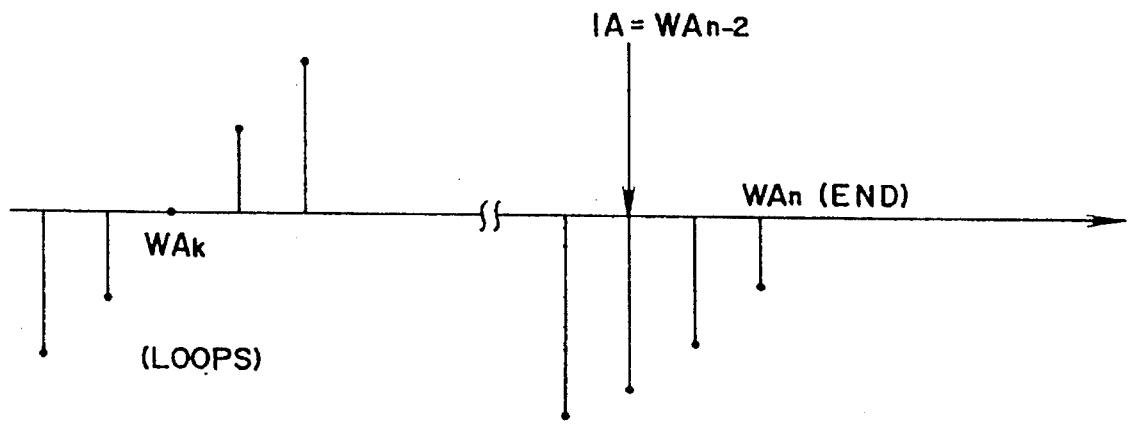

In addition, when sample addresses IA+1 to IA+4 are generated by the address increment circuit INC, some sample addresses may exceed the ending address END. For example, as shown in FIG. 10, in the case where the basic sample address IA will be $WA_{n-2}$ which is less than the ending address END by [2] in a calculation cycle $M_j$, address IA+2 equals ending address END. Accordingly, after generating the sample address IA+2, the sample addresses LOOPS and LOOPS+1 must be generated by the address increment circuit INC. Hereinafter, this addressing method will be called "loop-back address generation".

In the address stepping circuit STP, Judgement is made as to whether basic address IA will exceed ending address END or not when the basic address IA is increased by the basic sample address update data INTG. In the case where the basic sample address IA will exceed the ending address END, the loop-back address generation corresponding to the basic sample address IA is carried out. In the address increment circuit INC, judgement is made as to whether the sample address to be generated next can be greater than the ending address END or not when increasing the current sample address. In the case where any sample address will exceed the ending address END, the loop-back address generation corresponding to the sample address is carried out.

Figure 11:
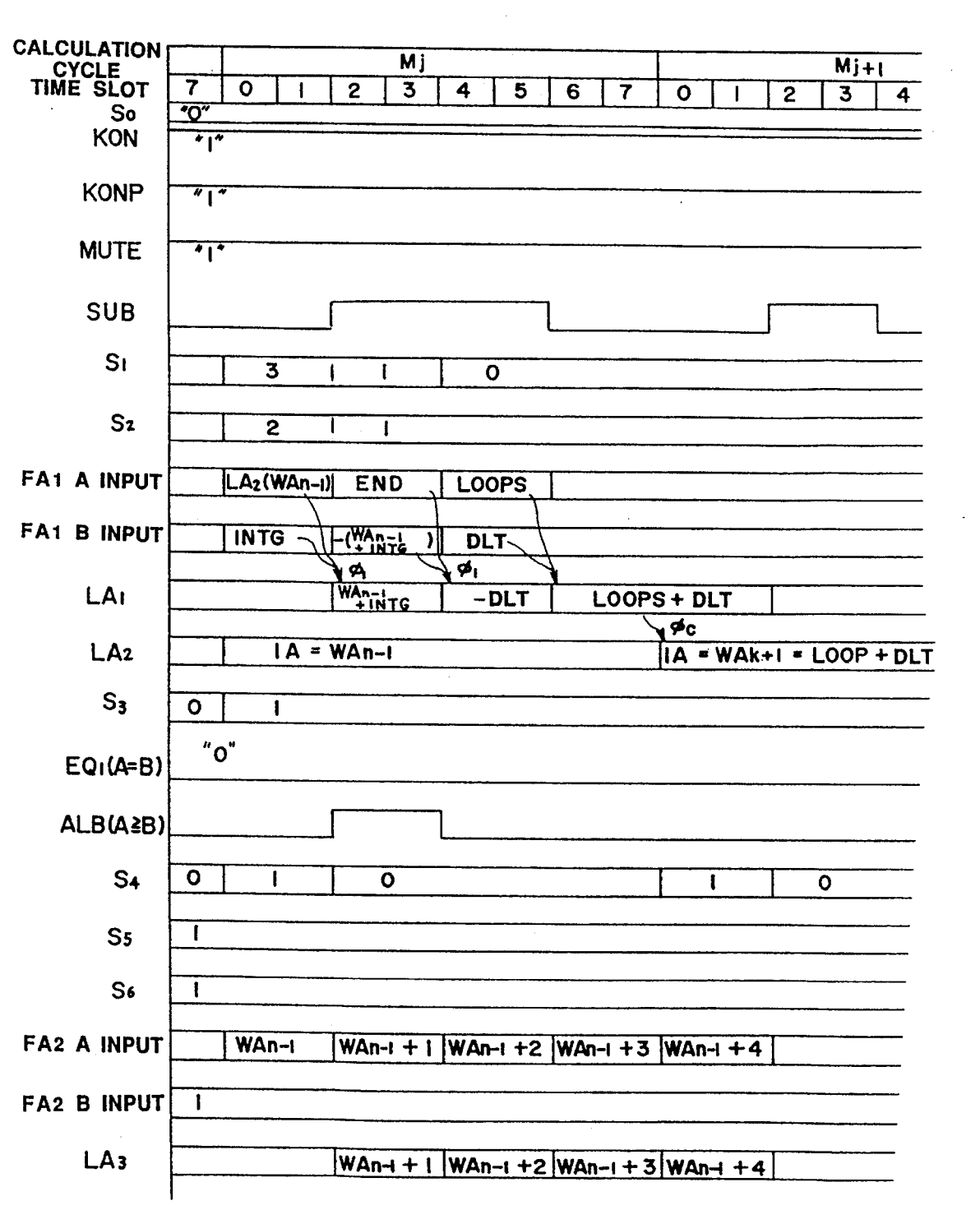

First, referring to FIG. 11, description will be given with respect to the loop-back address generation corresponding to the basic sample address IA which is carried out in the address stepping circuit STP. As shown in FIG. 11, when basic sample address IA is changed to $WA_{n-1}$ during calculation cycle $M_j$, the stored data of the latch $LA_1$ is updated to $WA_{n-1}$+INTG at the beginning of time slot No.2 of the calculation cycle $M_j$. During the time slots No.2 and No.3, the subtraction designating signal SUB is set to "1" so that the subtraction of END-($WA_{n-1}$+INTG) is executed by the full adder $FA_1$, and the result of the subtraction −DLT (in this case, −DLT<0) is outputted from the full adder $FA_1$. The output data −DLT is written to the latch $LA_1$ at the beginning of time slot No.4.

In addition, the result of subtraction is a negative value so that the output signal ALP outputted from the carry out terminal CO of the full adder $FA_1$ is set to "1" during the time slots No.2 and No.3. Consequently, the subtraction designating signal SUB is maintained at "1" by the system timing generator STG during the time slots No.4 and No.5. Further, at the beginning of time slot No.4, the selection designating signal $S_1$ is changed to [0] so that the loop starting address LOOPS is supplied to the input terminal A of the full adder $FA_1$ via the selectors $SEL_0$ and $SEL_1$. Thus, the subtraction of LOOPS−(−DLT)=LOOPS+DLT is executed by the full adder $FA_1$, the result of LOOPS+DLT is written to the latch $LA_1$ at the beginning of time slot No.6. Then, the data LOOPS+DLT stored in the latch $LA_1$ is written to the latch $LA_2$ as the basic sample address IA at the beginning of time slot No.0 of the next calculation cycle $M_{j+1}$. Thereafter, the basic sample address IA will be updated every calculation cycle as above mentioned. In the address increment circuit INC, the sample addresses IA+1, IA+2, IA+3 and IA+4 (in the case where 3RD="0") or IA, IA+1, IA+2 and IA+3 (in the case where 3RD="1") will be generated and supplied to the waveform memory MEM as described above.

Next, referring to FIG. 12, the description will be given with respect to the loop-back address generation corresponding to the sample address which is carried out in the address increment circuit INC. In the case where the basic sample address IA is changed to $WA_{n-2}$ in the calculation cycle $M_j$ as mentioned above, the stored data of the latch $LA_3$ will be changed to $WA_{n-2}$+2 which is equal to the ending address END. Thus, the output signal EQ of the comparison circuit CMP is set to "1" during the time slots No.4 to No.5. Consequently, during the time slots No.4 to No. 5, the selection designating signals $S_5$ and $S_6$ are both set to [0] so that the loop starting address LOOPS and a fixed data [0] are inputted to the full adder $FA_2$ so that the result of addition of LOOPS is outputted from the full adder $FA_2$. The stored data of the latch $LA_2$ is updated by the data LOOPS at the beginning of time slot No.6. In addition, the selection designating signal $S_6$ is changed to [1] so that the stored data of the latch $LA_3$ is changed to LOOPS+1 at the beginning of time slot No.6.

<Operation of interpolating circuit OVS>

Figure 13B:

Referring to FIGS. 13A 13B(*a*) and 14A to 14C, the description will be given with respect to the operation of the interpolating circuit OVS.

FIGS. 13A(a) 13B(a) show the sample data read out from the waveform memory MEM in the case where the basic address update data INTG=[0], FIGS. 13A(b) to 13B(b) show the read out sample data in the case where INTG=[1], FIGS. 13A(c) to 13B(c) show the read out sample data in the case where INTG=[2], FIGS. 13A(d) to 13B(d) show the read out sample data in the case where INTG=[3] and FIGS. A(e) and 13B(e) show the read out sample data in the case where INTG=[4]. In addition, FIGS. 13A and 13B show the operation in the case where the basic sample address is changed to k (k is an integral number) in the calculation cycle $M_i$. Further, in FIGS. 13A and 13B, $W_k$ designates the sample data corresponding to basic sample address IA=k, $W_{k+1}$ designates the sample data corresponding to sample address k+1 . . . , $W_{k+7}$ designates the sample data corresponding to sample address k+7.

The sample data read out from the waveform memory MEM is inputted at register $DL_0$, and is shifted through registers $DL_1$ and $DL_2$ in synchronization with clock $\phi_1$. In the case where INTG=[0] to [3], the sample data $W_{k+1}$ is read out from the waveform memory MEM at time slot No.0 of the calculation cycle $M_i$, and then sample data $W_{k+1}$ is delayed by 3 time slots. The delayed sample data is outputted from the register $DL_2$ at the beginning of time slot No.0 of the calculation cycle $M_{i+1}$. In the case where INTG=[4], the sample data $W_k$ is outputted from the register $DL_2$ in the time slot No.0 of the calculation cycle $M_{j+1}$.

During the time slot No.1 of the calculation cycle $M_{j+1}$, the load signal LD is set to "1" so that the operation mode of the shift register $REG_1$ is set to parallel loading mode. In addition, the AND circuit $G_7$ is supplied the load signal LD (level "1") so that the sample data $W_{k+1}$ (in the case where INTG=[0] to [3]) or $W_k$ (in the case where INTG=[4]) outputted from the register $DL_2$ is inputted at input terminal No.0 of the selector $SEL_7$ via the AND circuit $G_7$ and the OR circuit $G_7$. At the time slot No.2, the sample data read out from the waveform memory MEM and the output data of registers $DL_0$ and $DL_1$ are loaded into the shift register $REG_1$ in parallel manner in synchronization with the clock $\phi_0$. After the time slot No.3, the stored data of the shift register $REG_1$ are sequentially outputted thereof in synchronization with the clock $\phi_0$ in serial manner. The serial output data of the shift register $REG_1$ is sequentially inputted at input terminal No.0 of the selector $SEL_7$.

Thus, in the case where INTG=[0] to [3], the sample data $W_{k+1}$, $W_{k+2}$, $W_{k+3}$ and $W_{k+4}$ are sequentially inputted at input terminal No. 0 of the selector $SEL_7$ during the time slots No.2 to No.5 of the calculation cycle $M_{i+1}$. In the case where INTG=[4], the sample data $W_k$, $W_{k+1}$, $W_{k+2}$ and $W_{k+3}$ are sequentially inputted at input terminal No. 0 of the selector $SEL_7$ during the time slots No.2 to No.5.

As shown in FIGS. 13A(f) to 13A(j) and 13B(f) to 13B(j), the selection designating signal SLC is set to [1] during the time slots No.1 to No.4 and is set to [6] during the time slot No.5. During the time slots No.6, No.7 and No.0 , the selection designating signal SLC is changed in response to the integer INT of the phase data PHa as follows.

| | |
|---|---|
| INT = [0] | → SLC = [5] |
| INT = [1] | → SLC = [4] |
| INT = [2] | → SLC = [3] |
| INT = [3] | → SLC = [2] |
| INT is more than [4] | → SLC = [1] |

Accordingly, during the time slots No.1 to No.4 in every calculating cycle, the sample data outputted from the OR circuit $G_8$ is inputted to the register $DL_3$ via the selector $SEL_7$. Consequently, in the case where INTG=[0] to [3]; the sample data $W_{k+1}$, $W_{k+2}$, $W_{k+3}$ and $W_{k+4}$ are sequentially written to the register $DL_3$ in synchronization with the clock $\phi_0$ during the time slots No.2 to No.5. Further, the output data of the register $DL_3$ is inputted to the shift register $REG_2$ and shift through the stages of the shift register $REG_2$ in synchronization with the clock $\phi_0$, In the case where INTG is more than [4], the sample data $W_k$, $W_{k+1}$, $W_{k+2}$ and $W_{k+3}$ are sequentially written to the register $DL_3$ during the time slots No.2 to No.5.

At the time slot No.5, the selection designating signal SLC is set to [6] so that the fixed data [0] is selected and outputted toward the register $DL_3$. The output data [0] of the selector $SEL_7$ is written to the register $DL_3$ at the beginning of time slot No.6. The output data [0] of the register $DL_3$ is also written to the shift register $REG_2$.

Figure 14A:
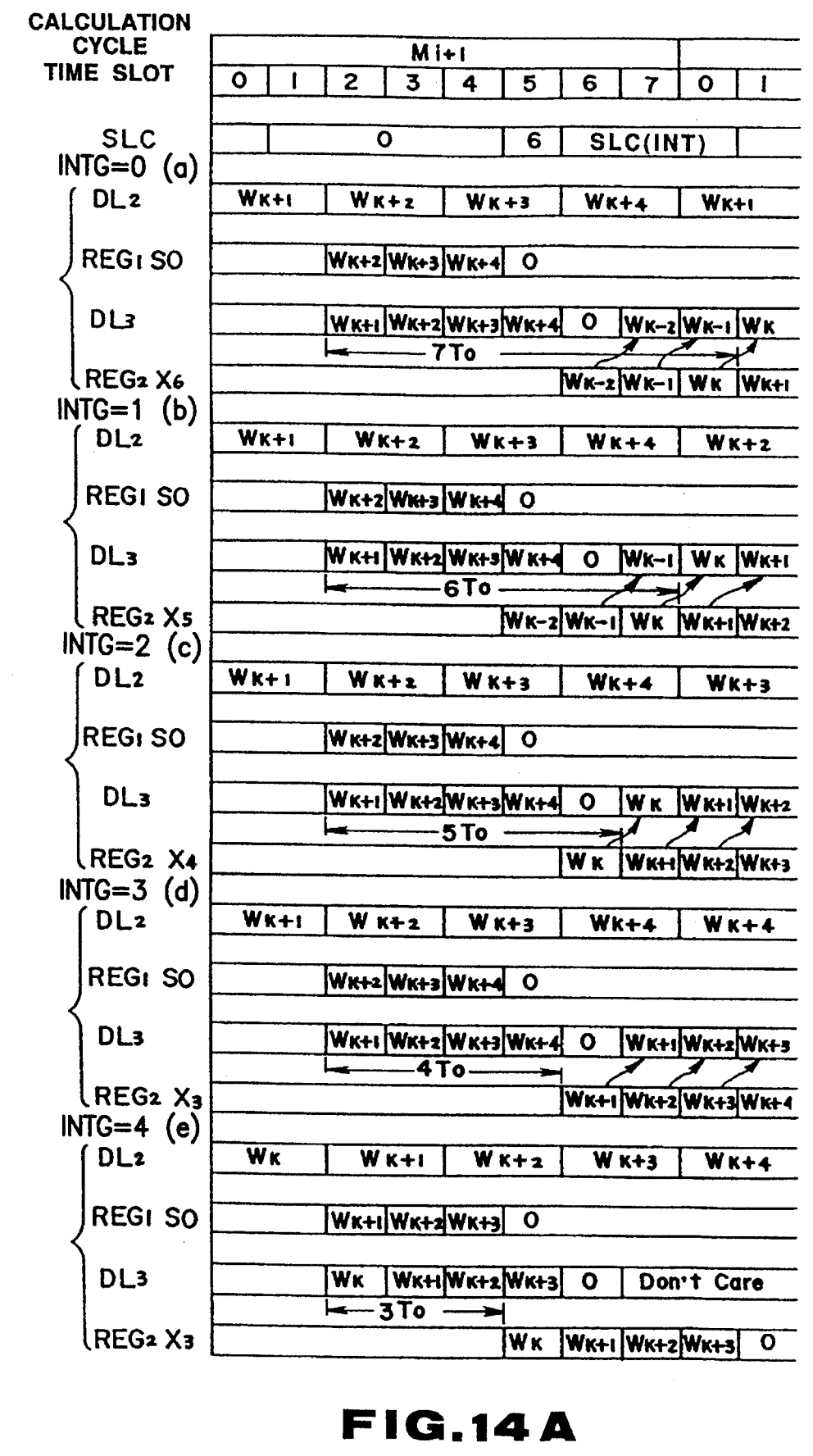
Figure 14B:
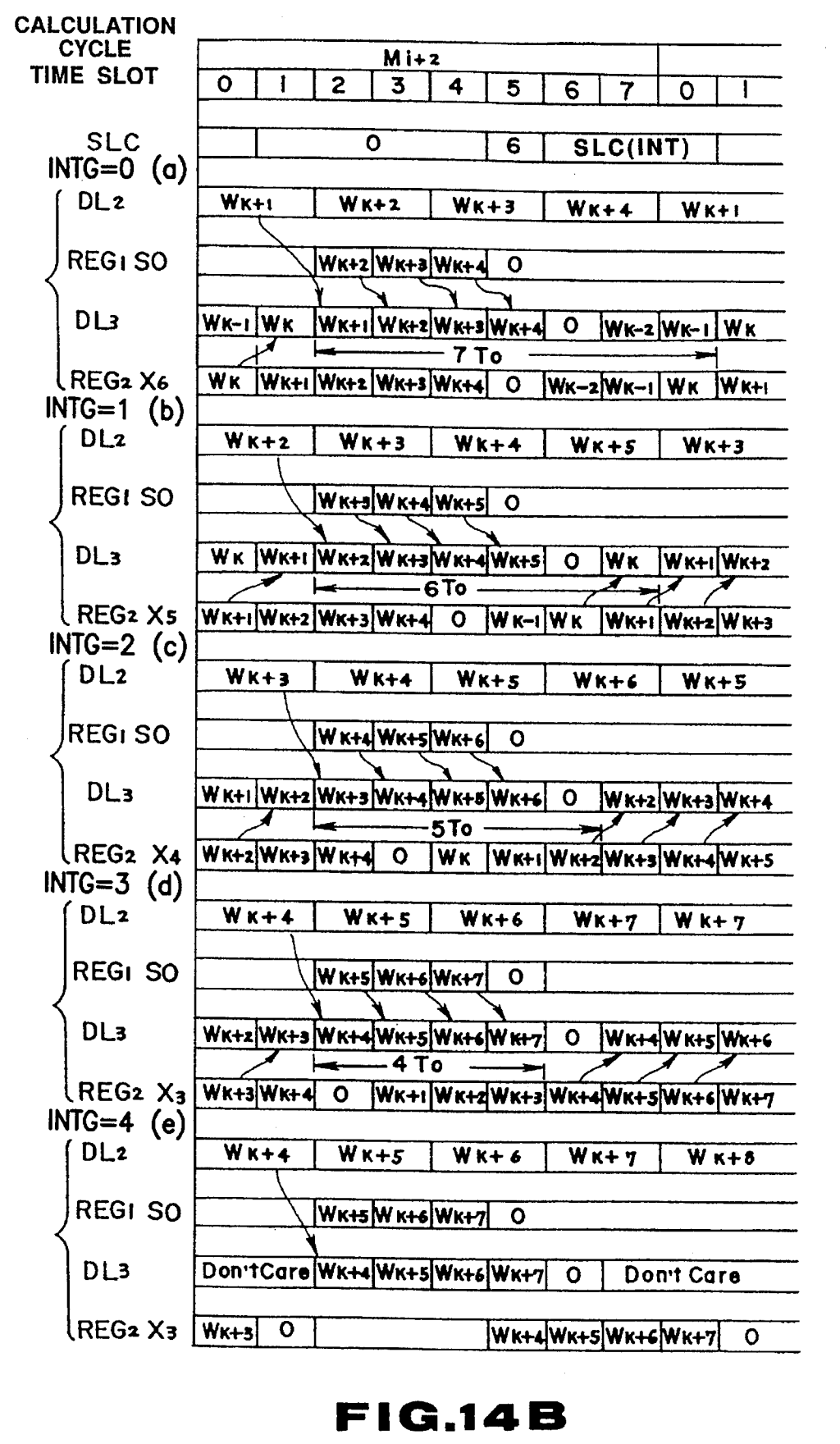

During the time slot No.6 of each calculation cycle to the time slot No.0 of the next calculation cycle, the selection designating signal SLC is changed in response to the integer INT of the phase data PHa so that the operation will be carried out in the manner corresponding to the data INT. Herein, the data INT is the data which is delayed the data INTG by a calculation cycle in phase. However, it can be regarded that the data INT nearly equals to the data INTG in usually. Thereafter, referring to FIGS. 14A to 14C, the description will be given with respect to the operations of the interpolating circuit OVS in the case where (a)INTG=[0], (b)INTG=[1], (c)INTG=[2], (d)INTG=[3], (e)INTG=[4] and (f)INTG=[5].

(a) In the case where INTG=[0]

From time slot No.6 to time slot No.0 of the next calculation cycle, the output data $X_6$ of the stage No.6 of the shift register $REG_2$ is selected and outputted toward the register $DL_3$ by the selector $SEL_7$. The data outputted from the selector $SEL_6$ in each time slot is written to the register $DL_3$ in the next time slot. Thus, the data outputted from the register $DL_3$ will be written to the register $DL_3$ again after a lapse of 7 time slots.

Consequently, the sample data $W_{k-2}$ is written to the register $DL_3$ at the beginning of time slot No.7 of the calculation cycle $M_{i+1}$. Sample data $W_{k-1}$ is written to the register $DL_3$ at the beginning of time slot No.0 of the next calculation cycle $M_{i+2}$. Sample data $W_k$ is written to the register $DL_3$ at the beginning of time slot No.1. Herein, the sample data $W_{k-2}$, $W_{k-1}$ and $W_k$ are previous sample data which have been read out from the waveform memory MEM and written to the shift register $REG_2$ in the previous calculation cycle of the calculation cycle $M_{i+1}$. The drawling is omitted with respect to the operation of that the sample data $W_{k-2}$ to $W_k$ are written to the register $REG_2$.

During the time slot No.2 to No.5 of the calculation cycle $M_{i+2}$, new 4 sample data supplied from the OR circuit $G_8$ are sequentially written to the register $DL_3$. In this case, the basic sample address update data INTG is set to [0] so that the same sample data $W_{k+1}$, $W_{k+2}$, $W_{k+3}$ and $W_{k+4}$ outputted in the preceding calculation cycle are sequentially outputted from the OR circuit $G_8$ and written to the register $DL_3$ again. In the time slot No.6, a data [0] is written to the register $DL_3$.

By the above described operation, during the time slot No.7 of the calculation cycle $M_{i+1}$ to the time slot No.5 of the next calculation cycle $M_{i+2}$, the data $W_{k-2}$, $W_{k-1}$, $W_k$, $W_{k+1}$, $W_{k+2}$, $W_{k+3}$ and $W_{k+4}$ are sequentially supplied from the register $DL_3$ to the interpolation calculator HK. Further, in synchronization with the sample data being supplied to the interpolation calculator HK, the interpolation coefficients are sequentially read out from the coefficient memory CM and supplied to the interpolating calculator HK. In this case, the pitch judgement signal 3RD is "0" so that 7 coefficients which correspond to the 6th order interpolation and correspond to the fraction FRAC of the phase data PHa are read out from the coefficient memory CM, and the read out 7 coefficients are sequentially supplied to the interpolating calculator HK. By the interpolating calculator HK, the multiplication between each sample data and the coefficient corresponding to the sample data is sequentially carried out, and the result of the multiplication is sequentially summed. In this manner, the interpolation of the sample data $V_{ak}$ shown in FIG. 15(a) is calculated. In this drawing, the length $F_1$ corresponds to the fraction FRAC of the phase data PHa. The interpolation results is outputted from the interpolation calculator HK and is written to the register $DL_4$. The stored data of the register $DL_4$ is outputted as the sample data of the regenerated waveform.

In the next calculation cycle $M_{i+3}$, the basic address update data INTG is [0] so that the sample data $W_{k+1}$, $W_{k+2}$, $W_{k+3}$ and $W_{k+4}$ are written to the register $DL_3$ during the time slot No.2 to No.5 of the calculation cycle $M_{i+2}$, the sample data $W_{k-2}$ to $W_{k+4}$ i.e., the same sample data of the preceding calculation cycle $M_{i+1}$ are outputted during the time slot No.7 to the time slot No.5 of the next calculation cycle $M_{i+3}$. In this case, the fraction FRAC of the phase data PHa is increased by the fraction of the preceding phase data PHa. Thus, calculated is the sample data having a phase corresponding to the length $F_2$ which is longer than the length $F_1$ as shown in FIG. 15(a).

(b) In the case where INTG=[1]

In this case, during the time slot No.6 to the time slot No.0 of the next calculation cycle, the output data $X_5$ of the stage No.5 of the shift register $REG_2$ is selected and outputted toward the register $DL_3$ by the selector $SEL_7$. Thus, the data outputted from the register $DL_3$ will be written to the register $DL_3$ again after a lapse of 6 time slots.

Consequently, the sample data $W_{k-1}$ is written to the register $DL_3$ in the time slot No.7 of the calculation cycle $M_{i+1}$; the sample data $W_k$ is written to the register $DL_3$ in the time slot No.0 of the next calculation cycle $M_{i+2}$; the sample data $W_{k+1}$ is written to the register $DL_3$ in the time slot No.1. Thus, during the time slots No.2 to No.5 of the calculation cycle $M_{i+2}$, 4 sample data supplied from the OR circuit $G_8$ are sequentially written to the register $DL_3$. In this case, the basic address update data INTG is set to [1] so that the same sample data $W_{+2}$, $W_{+3}$, $Wk+_4$ and $W_{k+5}$ are written to the register $DL_3$.

By the above described operation, during the time slot No.7 of the calculation cycle $M_{i+1}$ to the time slot No.5 of the next calculation cycle $M_{i+2}$, the data $W_{k-1}$, $W_k$, $W_{k+1}$, $W_{+2}$, $W_{k+3}$, $W_{k+4}$ and $W_{k+5}$ are sequentially supplied from the register $DL_3$ to the interpolating calculator HK. Further, in synchronization with that the sample data is supplied to the interpolating calculator HK, the interpolation coefficients are sequentially read out from the coefficient memory CM and supplied to the interpolating calculator HK. In this case, the pitch judgement signal 3RD is "0" so that 7 coefficients corresponding to the fraction FRAC of the phase data PHa are read out from the coefficient memory CM, and the read out 7 coefficients are sequentially supplied to the interpolating calculator HK. By the interpolation calculator HK, the 6th order interpolation is carried out on the basis of supplied sample data and coefficients.

In this manner, the interpolation of the sample data $V_{bk}$ shown in FIG. 15(b) is carried out. In this drawing, the length $F_b$ corresponds to the fraction FRAC of the phase data PHa. The interpolation results is outputted from the interpolating calculator HK and is written to the register $DL_4$. The stored data of the register $DL_4$ is outputted as the sample data of the regenerated waveform.

In the next calculation cycle $M_{i+3}$, the basic address update data INTG is [0] so that the sample data $W_{k+1}$, $W_{k+2}$, $W_{k+3}$ and $W_{k+4}$ are written to the register $DL_3$ during the time slot No.2 to No.5 of the calculation cycle $M_{i+2}$, the sample data $W_k$ to $W_{k+6}$ are supplied to the interpolating calculator HK. Consequently, the sample data $V_{bk+1}$ shown in FIG. 15(b) is calculated.

(c) In the case where INTG=[2]

In this case, the operation similar to the operation in the case where INTG=[1] is carried out as follows. But, in this case, the output data of the register $DL_3$ will be written to the register $DL_3$ again after a lapse of 5 time slots so that the data $W_k$, $W_{k+1}$, $W_{k+2}$, $W_{+3}$, $W_{k+4}$, $W_{k+5}$ and $W_{k+6}$ are sequentially supplied from the register $DL_3$ to the interpolation calculator HK during the time slot No.7 of the calculation cycle $M_{i+1}$ to the time slot No.5 of the next calculation cycle $M_{i+2}$. Consequently, the sample data $V_{ck}$ shown in FIG. 15(c) is calculated by the 6th order interpolation. Next, the data $W_{+2}$, $W_{+3}$, $W_{k+4}$, $W_{k+5}$, $W_{k+6}$, $W_{k+7}$ and $W_{k+8}$ are sequentially supplied to the interpolating calculator HK during the time slot No.7 of the calculation cycle $M_{i+2}$ to the time slot No.5 of the next calculation cycle $M_{i+3}$. Consequently, the sample data $V_{ck+1}$ shown in FIG. 15(c) is calculated.

(d) In the case where INTG=[3]

In this case, the output data of the register $DL_3$ will be written to the register $DL_3$ again after a lapse of 4 time slots so that the data $W_{k+1}$, $W_{k+2}$, $W_{+3}$, $W_{k+4}$, $W_{k+5}$, $W_{k+6}$ and $W_{k+7}$ are sequentially supplied from the register $DL_3$ to the interpolating calculator HK during the time slot No.7 of the calculation cycle $M_{i+1}$ to the time slot No.5 of the next calculation cycle $M_{i+2}$. Consequently, the sample data $V_{ok}$ shown in FIG. 15(d) is calculated by the 6th order interpolation. Next, the data $W_{k+4}$, $W_{k+5}$, $W_{k+6}$, $W_{k+7}$, $W_{k+8}$, $W_{k+9}$ and $W_{k+10}$ are sequentially supplied to the interpolating calculator HK during the time slot No.7 of the calculation cycle $M_{i+2}$ to the time slot No.5 of the next calculation cycle $M_{i+3}$. Consequently, the sample data $V_{dk+1}$ shown in FIG. 15(d) is calculated.

(e) In the case where INTG=[4]

In this case, when the basic sample address IA is k, 4 sample address k, k+1, k+2, k+3 are sequentially supplied to the waveform memory MEM. Accordingly, 4 sample data $W_k$ to $W_{k+3}$ are sequentially outputted from the register $DL_2$ in the calculation cycle $M_{i+1}$. Next, 4 sample data $W_{k+4}$ to $W_{k+7}$ are sequentially outputted from the register $DL_2$ in the calculation cycle $M_{i+1}$, because the basic sample address IA is increased to k+4 in the calculation cycle $M_{i+1}$.

During the time slot No.2 to No.5 of the calculation cycle $M_1$, the sample data $W_k$, $W_{k+1}$, $W_{k+2}$ and $W_{k+3}$ are supplied to the Interpolating calculator HK from the register $DL_3$. Herein, the data supplied to the interpolating calculator HK during the time slot No.7 to the time slot No.1 of the next calculation cycle $M_{i+1}$, but these sample data are ignored by the interpolation calculator HK, because the pitch judgement signal 3RD="1". Thus, the 3th order interpolation is carried out by the interpolating calculator HK on the basis of the sample data $W_k$, $W_{k+1}$, $W_{k+2}$ and $W_{k+3}$ resulting in the sample data $V_{ek}$ shown in FIG. 15(e). Next, in the calculation cycle $M_{i+1}$, the 3th order interpolation is carried on the basis of the sample data $W_{k+4}$, $W_{k+5}$, $W_{k+6}$ and $W_{k+7}$ resulting in the sample data $V_{ek+1}$ shown in FIG. 15(e).

(f) In the case where INTG=[5]

When the basic address update data INTG is changed, changing is occurred in the phase difference between the phase of the current sample data and the phase of the sample data in the preceding calculation cycle. However, in the case where INTG is more than [5], the operation is substantial same as the operation in the case where INTG=[4] is carried out. The 3th interpolation is carried out on the basis of the preceding sample data corresponding to the basic sample address IA and the later 3 sample data.

The waveform generating apparatus can regenerate the sample data stored in the waveform memory MEM in reverse manner. When generating the sample data in reverse manner, the selection designating signal $S_1$ is set to [1], the selection designating signal $S_2$ is set to [0] and the basic sample address IA is set to the ending address END in the first calculation cycle after key-on event. When updating the basic sample address IA in every calculation cycle, the subtraction designating signal SUB is set to "1". Consequently, the basic sample address is decreased by the basis address update data INTG in every calculating cycle. Further, when generating the sample address in the address increment circuit INC, the selection designating signal $S_6$ is set to [2] so that the sample address which are sequentially decreased by one are generated. In this manner, the waveform generating apparatus can generate the reverse waveform which is inverted the basic waveform along time axis in a desired pitch, by only changing the manner in which the selection designating signal and the subtraction designating signal SUB are controlled.

In the above, the description has been given with respect to the embodiment in the case where the interpolating method is altered between 6th interpolation and 3th interpolation in response to the pitch data. However, the order of the interpolation can chosen on the basis of the desired throughput and the desired calculating precision. Further, it can be possible that the order of the interpolation is changed in more than 3 stages in response to the pitch data. Furthermore, in the present invention, the interpolating manner is not limited. Plural interpolating method used in mathematics, for example, the Lagrange's interpolation and the like are applicable to the present invention.

What is claimed is:

1. Waveform generating apparatus comprising:
   tone pitch designating means for designating a tone pitch of a waveform to be regenerated;
   phase data generating means for generating phase data which corresponds to said tone pitch designated by the tone pitch designating means;
   waveform data generating means for generating data of said waveform based on said phase data by a calculation cycle, the number of the data of said waveform generated during the calculation cycle being limited by a predetermined value;
   interpolating means for interpolating said data of said waveform in synchronization with said calculation cycle with change of interpolation order in response to said tone pitch; and
   waveform generating means for generating a waveform based on the data of waveform interpolated by the interpolating means.

2. Waveform generating apparatus according to claim 1, wherein said waveform data generating means generates said data of said waveform by regenerating based on sample data read out from a waveform memory which stores basic waveform sample data.

3. A waveform generating apparatus according to claim 1, wherein when the tone pitch designated by said tone pitch designating means is high, said interpolation order is decreased so that the number of the data of said waveform required for the interpolation does not exceed said predetermined value.

4. A waveform generating apparatus for electronic musical instruments, the apparatus calculating and generating regenerated sample data of a regenerated waveform having a desired pitch in synchronization with a constant regeneration sampling interval based on basic sample data which are sampled from a basic waveform by a predetermined basic sampling interval, the apparatus comprising:
   phase generating means for generating phase data which designates a phase of said basic waveform;
   operation control means for supplying a calculation designating data;
   interpolating means for performing an interpolation operation on the basis of said basic sample data and said phase data so as to generate regenerated sample data, wherein the interpolation order is changeable based on said calculation designating data; and
   waveform regenerating means coupled to the interpolating means for generating a regenerated wave form based on the regenerated sample data interpolated by the interpolating means.

5. A waveform generating apparatus according to claim 4, wherein said calculation designation data designates a number of basic sample data and a type of coefficient; and
   said interpolating means calculates said regenerated sample data by using the designated number of basic sample data and the designated type of coefficient.

6. A waveform generating apparatus according to claim 4, wherein said calculation designating data is determined on the basis of the ratio between said regeneration sampling interval and said basic sampling interval.

7. A waveform generating apparatus according to claim 4, further including a waveform memory which stores said basic sample data, and wherein said interpolating means calculates said regenerated sample data by using the basic sample data read out from said waveform memory.

8. A waveform generating apparatus according to claim 7, further including register means which holds said basic sample data previously used for interpolating said regenerated sample data, and
   wherein said interpolating means calculates said regenerated sample data by using the data stored in said register means and said basic sample data read out from said waveform memory.

9. Waveform generating apparatus according to claim 4, further including tone pitch designating means which designates the desired pitch of a regenerated waveform, such that said operation control means changes said calculation designating data so that the order of the interpolation decreases when the desired pitch designated by said tone pitch designating means becomes higher.

10. A waveform generating apparatus comprising:
    address generating means for accumulating phase step data corresponding to a pitch of a waveform to be generated and outputting the accumulated result as an address;
    first memory means for storing sampled waveform data;
    second memory means for temporarily storing samples of said waveform data which are supplied from said first memory means from a previous calculation cycle;
    transfer means for reading out m samples of said waveform data from said first memory means, which corresponds to said address, in each calculation cycle;

interpolation means for receiving n samples of said waveform data in which m of said n samples are supplied by said transfer means and (n−m) of said n samples are supplied from said second memory means, performing interpolation using said n samples and outputting an interpolated waveform sample in each calculation cycle, wherein said m samples supplied by said transfer means are simultaneously supplied to said second memory means and are temporarily stored therein for use in a next calculation cycle; and waveform regeneration means coupled to the interpolation means for generating a waveform signal having said pitch based on the interpolated sample, wherein said m and n are both integer numbers, and m is smaller than n.

11. A waveform generating apparatus according to claim 10, wherein said m samples that are temporarily stored in said second memory means are used as the (n−m) of said n samples for the immediately preceding interpolation.

12. A waveform generating apparatus comprising:

an address generator for accumulating phase step data corresponding to a pitch of a waveform to be generated and outputting the accumulated result as an address;

a waveform memory device that has stored waveform data which includes a plurality of samples corresponding to at least one waveform;

an interpolation circuit that performs an interpolation operation using a predetermined number of samples from among the waveform data, which are supplied from the waveform memory device, and outputting an interpolated sample in each calculation cycle;

a transfer circuit that reads out samples of the waveform data from the waveform memory device, which corresponds to said address, in each calculation cycle and supplying the read out samples to the interpolation circuit as part of the predetermined number of samples;

a temporary memory device that temporarily stores the samples supplied from the waveform memory device to the interpolation circuit, wherein the temporarily stored samples are used as part of the predetermined number of samples of the waveform data for a next interpolation operation in the interpolation circuit; and a waveform regenerator circuit coupled to the interpolation circuit that generates a waveform signal having the pitch based on the interpolated sample.

* * * * *